(12) United States Patent
Gao et al.

(10) Patent No.: US 11,029,501 B2
(45) Date of Patent: Jun. 8, 2021

(54) CAMERA LENS ASSEMBLY

(71) Applicant: Zhejiang Sunny Optical Co., Ltd, Ningbo (CN)

(72) Inventors: Xue Gao, Ningbo (CN); Ming Li, Ningbo (CN); Jianke Wenren, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 255 days.

(21) Appl. No.: 16/273,584

(22) Filed: Feb. 12, 2019

(65) Prior Publication Data
US 2019/0170987 A1 Jun. 6, 2019

Related U.S. Application Data

(63) Continuation of application No. PCT/CN2018/100471, filed on Aug. 14, 2018.

(30) Foreign Application Priority Data

Oct. 25, 2017 (CN) .......................... 201711007882.4
Oct. 25, 2017 (CN) .......................... 201721397246.2

(51) Int. Cl.
*G02B 13/18* (2006.01)
*G02B 13/00* (2006.01)
*G02B 9/64* (2006.01)

(52) U.S. Cl.
CPC .............. *G02B 13/18* (2013.01); *G02B 9/64* (2013.01); *G02B 13/0045* (2013.01)

(58) Field of Classification Search
CPC ....... G02B 13/18; G02B 13/0045; G02B 9/64

USPC ......................................................... 359/755
See application file for complete search history.

(56) References Cited

U.S. PATENT DOCUMENTS

| | | | |
|---|---|---|---|
| 10,191,248 B2 * | 1/2019 | Hashimoto | .............. G02B 9/64 |
| 2014/0139719 A1 | 5/2014 | Fukaya | |
| 2017/0082834 A1 | 3/2017 | Tang et al. | |
| 2017/0082835 A1 | 3/2017 | Tang et al. | |
| 2017/0090157 A1 | 3/2017 | Tang et al. | |
| 2017/0090158 A1 | 3/2017 | Tang et al. | |
| 2017/0176723 A1 | 6/2017 | Fukaya | |
| 2019/0121100 A1 * | 4/2019 | Song | ....................... G02B 13/00 |
| 2020/0103628 A1 * | 4/2020 | Sekine | ................... G02B 5/208 |

FOREIGN PATENT DOCUMENTS

| | | |
|---|---|---|
| CN | 106950681 | 7/2017 |
| JP | 2015-72403 | 4/2015 |

* cited by examiner

*Primary Examiner* — Mohammed A Hasan
(74) *Attorney, Agent, or Firm* — Hauptman Ham, LLP

(57) ABSTRACT

The present disclosure discloses a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens is a convex surface, and an image-side surface of the sixth lens is a convex surface; and a seventh lens having a negative refractive power, where an object-side surface of the seventh lens is a convex surface. An effective focal length f2 of the second lens and a total effective focal length f of the camera lens assembly satisfy: $-3 \leq f2/f < -1.5$.

19 Claims, 12 Drawing Sheets

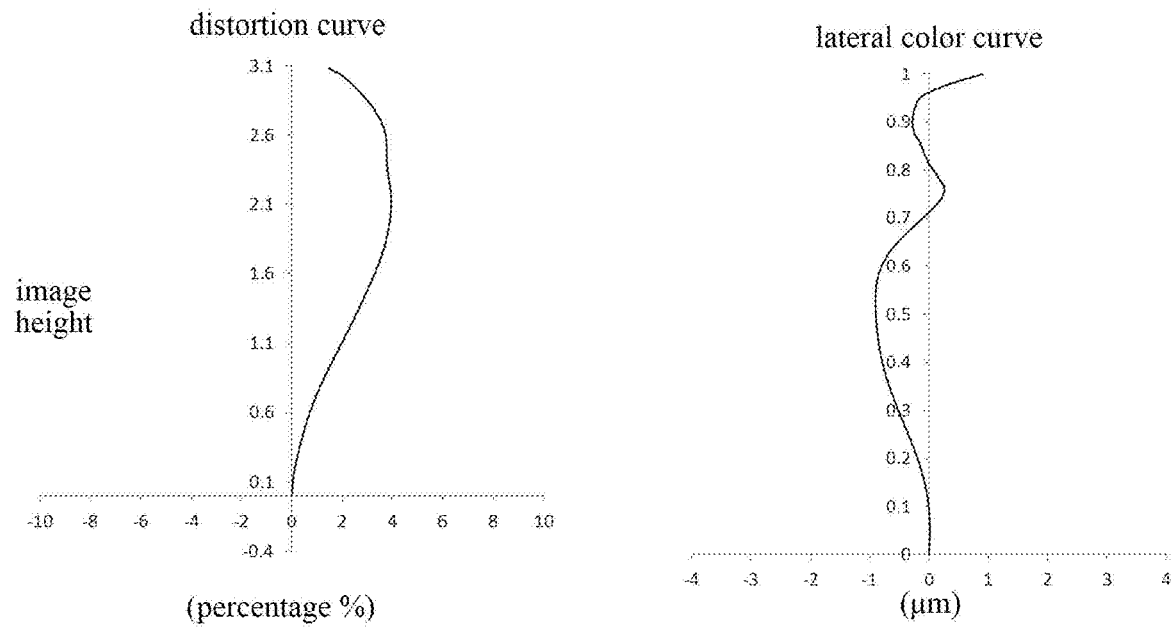
Fig. 10C
Fig. 10D
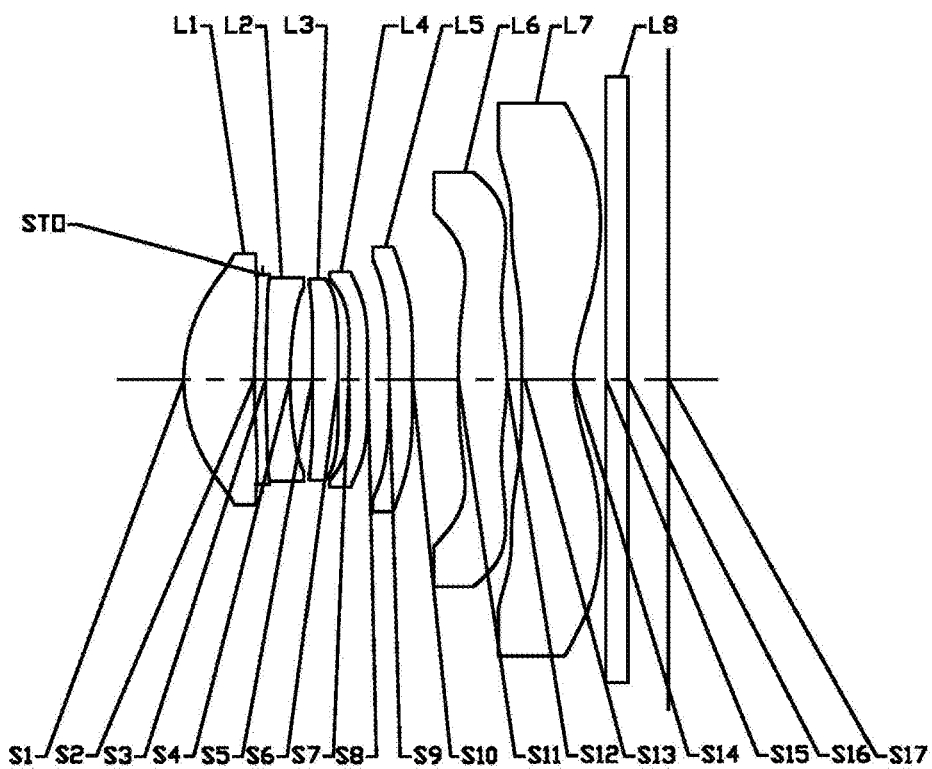
Fig. 11

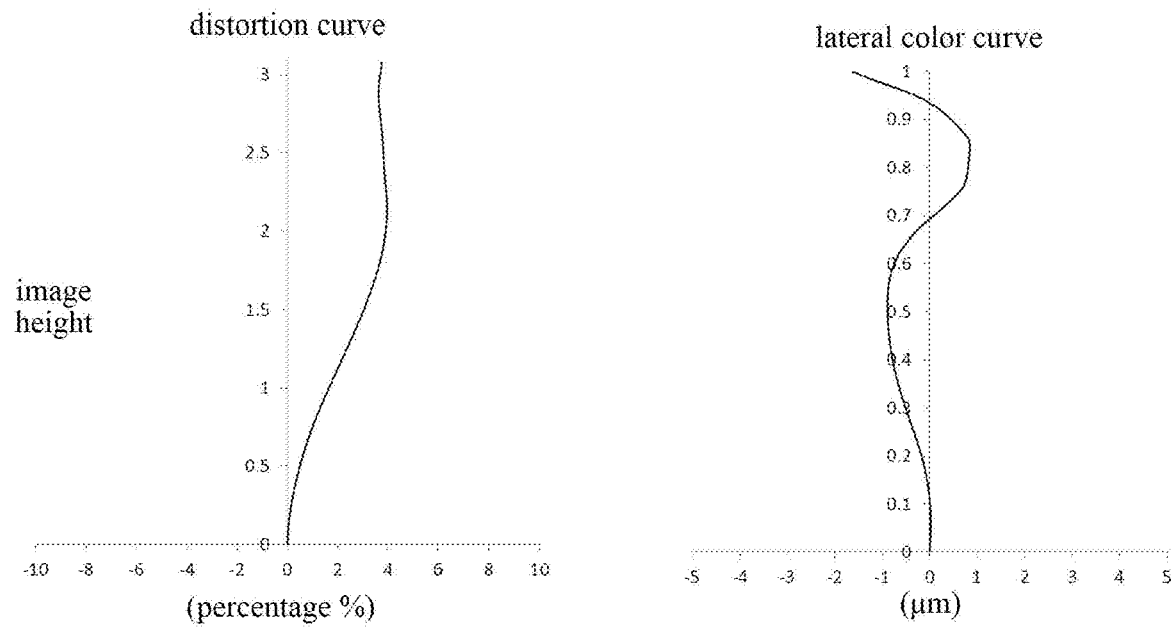
Fig. 14C
Fig. 14D
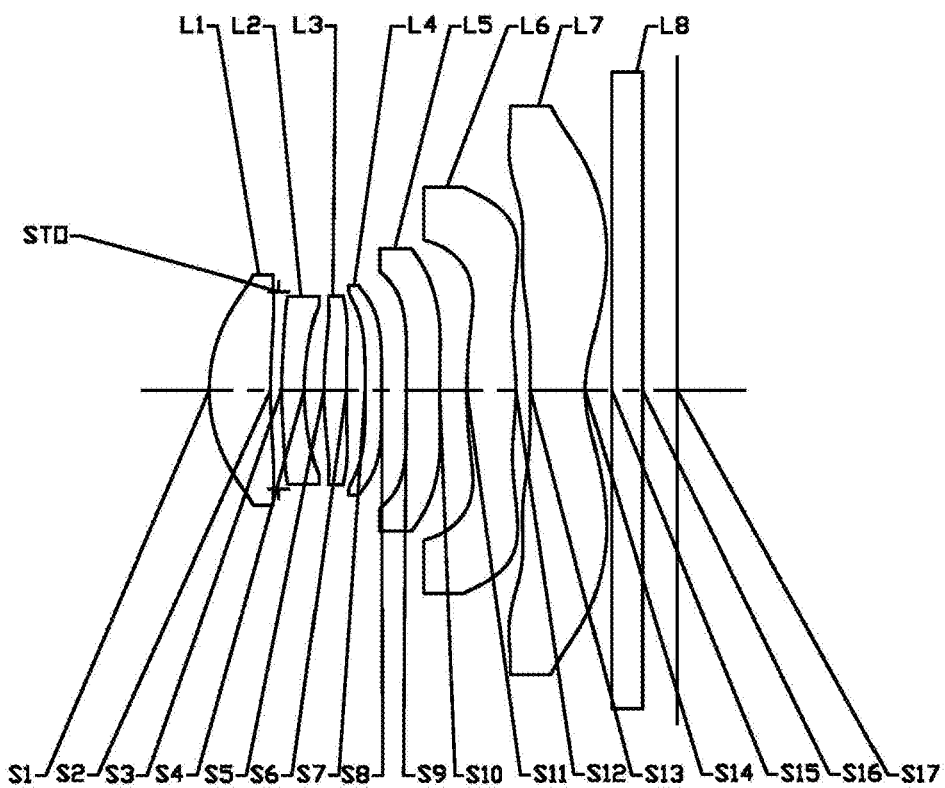
Fig. 15

CAMERA LENS ASSEMBLY

CROSS-REFERENCE TO RELATED APPLICATIONS

This application is a continuation of International Application No. PCT/CN2018/100471, filed on Aug. 14, 2018, which claims the priorities and rights to Chinese Patent Application No. 201711007882.4 and Chinese Patent Application No. 201721397246.2 filed with the State Intellectual Property Office of China (SIPO) on Oct. 25, 2017. The disclosures of aforementioned applications are hereby incorporated by reference in their entireties.

TECHNICAL FIELD

The present disclosure relates to a camera lens assembly, and more specifically to a camera lens assembly including seven lenses.

BACKGROUND

With the improvement in performance and reduction in size of the commonly used photosensitive elements such as charge-coupled devices (CCD) or complementary metal-oxide semiconductor elements (CMOS), the number of pixels of the photosensitive elements is increased and the size of the pixels is reduced. Accordingly, higher requirements on high imaging quality and miniaturization of the counterpart camera lens assemblies have been brought forward.

The reduction of the size of the pixels implies that, during a same exposure period, the amount of light passing through a lens assembly is decreased. However, in the condition of a dim environment, the lens assembly needs to have a large amount of light to ensure the imaging quality. A typical configuration of an existing lens assembly has an F-number Fno (total effective focal length of the lens assembly/entrance pupil diameter of the lens assembly) of 2.0 or above. Although this type of lens assembly can fulfill the miniaturization requirement, in situations such as insufficient light (e.g., cloudy and rainy days, or at dusk) or hand trembling, the imaging quality of the lens assembly cannot be ensured. Therefore, the lens assembly having the F-number Fno of 2.0 or above has been unable to fulfill the higher imaging requirements.

SUMMARY

The present disclosure provides a camera lens assembly which may be applicable to portable electronic products and may at least or partially solve at least one of the above disadvantages in the existing technology, for example, a camera lens assembly having a large aperture.

According to an aspect, the present disclosure provides a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens may be a convex surface, and an image-side surface of the sixth lens may be a convex surface; and a seventh lens having a negative refractive power, where an object-side surface of the seventh lens may be a convex surface. An effective focal length f2 of the second lens and a total effective focal length f of the camera lens assembly satisfy: $-3 \leq f2/f < -1.5$.

In an implementation, the total effective focal length f of the camera lens assembly and an entrance pupil diameter EPD of the camera lens assembly may satisfy: $f/EPD < 2.0$.

In an implementation, the total effective focal length f of the camera lens assembly, an effective focal length f1 of the first lens, and the effective focal length f2 of the second lens may satisfy: $1 < |f/f1| + |f/f2| < 1.55$.

In an implementation, a radius R2 of curvature of an image-side surface of the first lens and the effective focal length f1 of the first lens may satisfy: $1.3 < R2/f1 < 2$.

In an implementation, the sixth lens may have a positive refractive power. An effective focal length f6 of the sixth lens and a total track length TTL of the camera lens assembly may satisfy: $0.6 < f6/TTL < 1.3$.

In an implementation, an effective focal length f7 of the seventh lens and a center thickness CT7 of the seventh lens on the optical axis may satisfy: $-5 < f7/CT7 < -4$.

In an implementation, an object-side surface of the first lens may be a convex surface. The total effective focal length f of the camera lens assembly and a radius R1 of curvature of the object-side surface of the first lens MAY satisfy: $2 < f/R1 < 2.6$.

In an implementation, the radius R1 of curvature of the object-side surface of the first lens and a radius of curvature R14 of an image-side surface of the seventh lens may satisfy: $1 < R1/R14 < 1.5$.

In an implementation, an effective semi-diameter DT11 of the object-side surface of the first lens and an effective semi-diameter DT51 of an object-side surface of the fifth lens may satisfy: $0.8 < DT11/DT51 < 1.2$.

In an implementation, a distance SAG71 on the optical axis from an intersection point between the object-side surface of the seventh lens and the optical axis to a vertex of an effective semi-diameter of the object-side surface of the seventh lens and the center thickness CT7 of the seventh lens on the optical axis may satisfy: $-0.5 < SAG71/CT7 < 0$.

In an implementation, the total track length TTL of the camera lens assembly and a half ImgH of a diagonal length of an effective pixel area on an image plane of the camera lens assembly may satisfy: $TTL/ImgH < 1.65$.

In an implementation, a center thickness CT3 of the third lens on the optical axis and a center thickness CT4 of the fourth lens on the optical axis may satisfy: $1 < CT3/CT4 < 1.5$.

In an implementation, the center thickness CT4 of the fourth lens on the optical axis and a center thickness CT5 of the fifth lens on the optical axis may satisfy: $CT4/CT5 \leq 1$.

In an implementation, a spacing distance T56 on the optical axis between the fifth lens and the sixth lens and a spacing distance T67 on the optical axis between the sixth lens and the seventh lens may satisfy: $1.5 < T56/T67 < 3.2$.

According to another aspect, the present disclosure provides a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens may be a convex surface, and an image-side surface of the sixth lens may be a convex surface; and a seventh lens having a negative refractive power, where an object-side surface of the seventh lens may be a convex surface. A total effective focal length f of the camera lens assembly, an effective focal length f1 of the first lens, and an effective focal length f2 of the second lens may satisfy: $1<|f/f1|+|f/f2|<1.55$.

According to another aspect, the present disclosure further provides a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens may be a convex surface, and an image-side surface of the sixth lens may be a convex surface; and a seventh lens having a negative refractive power, where an object-side surface of the seventh lens may be a convex surface. An effective focal length f6 of the sixth lens and a total track length TTL of the camera lens assembly may satisfy: $0.6<f6/TTL<1.3$.

According to another aspect, the present disclosure further provides a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens may be a convex surface, and an image-side surface of the sixth lens may be a convex surface; and a seventh lens having a negative refractive power, where an object-side surface of the seventh lens may be a convex surface. A radius R2 of curvature of an image-side surface of the first lens and an effective focal length f1 of the first lens may satisfy: $1.3<R2/f1<2$.

According to another aspect, the present disclosure further provides a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens may be a convex surface, and an image-side surface of the sixth lens may be a convex surface; and a seventh lens having a negative refractive power, wherein an object-side surface of the seventh lens may be a convex surface. A radius R1 of curvature of an object-side surface of the first lens and a radius R14 of curvature of an image-side surface of the seventh lens may satisfy: $1<R1/R14<1.5$.

According to another aspect, the present disclosure further provides a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens may be a convex surface, and an image-side surface of the sixth lens may be a convex surface; and a seventh lens having a negative refractive power, where an object-side surface of the seventh lens may be a convex surface. A spacing distance T56 on the optical axis between the fifth lens and the sixth lens and a spacing distance T67 on the optical axis between the sixth lens and the seventh lens may satisfy: $1.5<T56/T67<3.2$.

According to another aspect, the present disclosure further provides a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens may be a convex surface, and an image-side surface of the sixth lens may be a convex surface; and a seventh lens having a negative refractive power, where an object-side surface of the seventh lens may be a convex surface. An effective semi-diameter DT11 of an object-side surface of the first lens and an effective semi-diameter DT51 of an object-side surface of the fifth lens may satisfy: $0.8<DT11/DT51<1.2$.

According to another aspect, the present disclosure further provides a camera lens assembly. The camera lens assembly includes, sequentially along an optical axis from an object side to an image side, a first lens having a positive refractive power; a second lens having a negative refractive power; a third lens having a refractive power; a fourth lens having a refractive power; a fifth lens having a refractive power; a sixth lens having a refractive power, where an object-side surface of the sixth lens may be a convex surface, and an image-side surface of the sixth lens may be a convex surface; and a seventh lens having a negative refractive power, where an object-side surface of the seventh lens may be a convex surface. A distance SAG71 on the optical axis from an intersection point between the object-side surface of the seventh lens and the optical axis to a vertex of an effective semi-diameter of the object-side surface of the seventh lens and a center thickness CT7 of the seventh lens on the optical axis may satisfy: $-0.5<SAG71/CT7<0$.

The present disclosure adopts a plurality of lenses (e.g., seven lenses). By reasonably setting the refractive powers and the surface types of the lenses, the center thicknesses of the lenses, and the axial spacing distances between the lenses, etc., the camera lens assembly has at least one of the beneficial effects such as ultra-thin, miniaturization, large-aperture, and high imaging quality.

BRIEF DESCRIPTION OF THE DRAWINGS

By describing non-limiting implementations below in detail with reference to the accompanying drawings, other features, objectives and advantages of the present disclosure will be more apparent. In the accompanying drawings:

FIGS. 10A-10D respectively illustrate a longitudinal aberration curve, an astigmatic curve, a distortion curve, and a lateral color curve of the camera lens assembly according to Embodiment 5;

FIG. 11 is a schematic structural diagram illustrating a camera lens assembly according to Embodiment 6 of the present disclosure;

FIGS. 14A-14D respectively illustrate a longitudinal aberration curve, an astigmatic curve, a distortion curve, and a lateral color curve of the camera lens assembly according to Embodiment 7;

FIG. 15 is a schematic structural diagram illustrating a camera lens assembly according to Embodiment 8 of the present disclosure.

DETAILED DESCRIPTION

Figure 1:
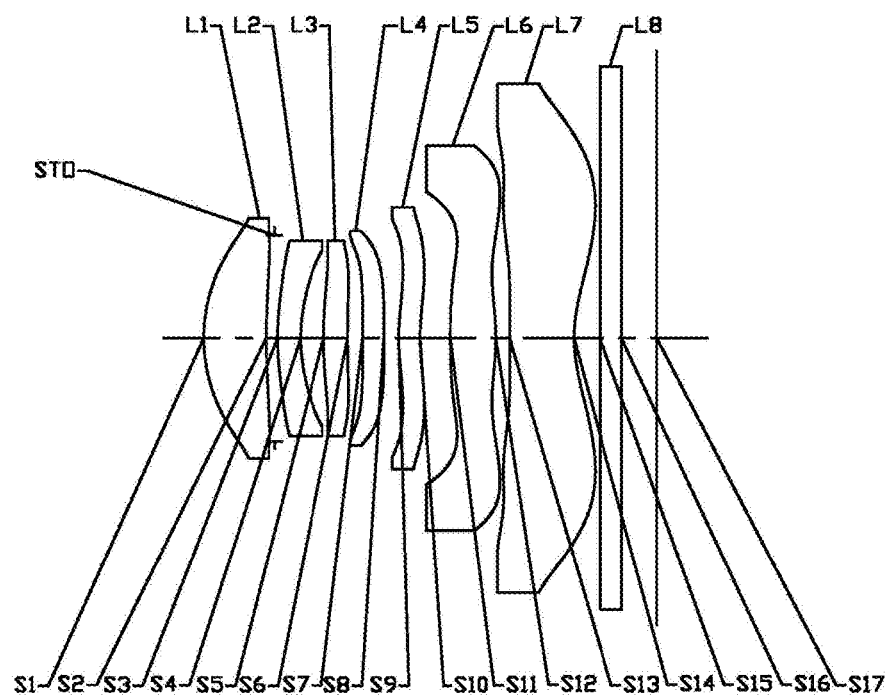
FIG. 1 is a schematic structural diagram illustrating a camera lens assembly according to Embodiment 1 of the present disclosure.

For better understanding the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of description. Specifically, shapes of spherical surfaces or aspheric surfaces shown in the accompanying drawings are examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens has a convex surface and a position of the convex surface is not defined, at least the portion of the surface of the lens in the paraxial area is the convex surface; and if the surface of the lens has a concave surface and a position of the concave surface is not defined, at least the portion of the surface of the lens in the paraxial area is the concave surface. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

A camera lens assembly according to exemplary implementations of the present disclosure may include, for example, seven lenses (i.e., a first lens, a second lens, a third lens, a fourth lens, a fifth lens, a sixth lens, and a seventh lens) having refractive powers. The seven lenses are arranged in sequence along an optical axis from an object side to an image side.

In the exemplary implementations, the camera lens assembly of the present disclosure may satisfy the conditional expression f/EPD<2.0. Here, f is the total effective focal length of the camera lens assembly, and EPD is the entrance pupil diameter of the camera lens assembly. More specifically, f and EPD may further satisfy: f/EPD<1.9, for example, 1.51≤f/EPD≤1.87. The smaller the ratio of the total effective focal length f of the camera lens assembly to the entrance pupil diameter EPD of the camera lens assembly is, the larger the clear aperture of the lens assembly is, and the greater the amount of light entering during a time unit is. When the lens assembly is configured to satisfy the conditional expression f/EPD<2.0, the lens assembly may have the advantage of large aperture, which may increase the amount of light passing through the system and enhance the imaging effect in a dim environment.

In the exemplary implementations, the camera lens assembly of the present disclosure may satisfy the conditional expression $-3 \le f2/f < -1.5$. Here, f2 is the effective focal length of the second lens, and f is the total effective focal length of the camera lens assembly. More specifically, f2 and f may further satisfy: $-3 \le f2/f < -2.1$, for example, $-2.97 \le f2/f \le -2.19$. Reasonably setting the refractive power of the second lens may effectively shorten the total track length of the lens assembly, thereby ensuring the ultra-thin characteristic of the lens assembly.

In the exemplary implementations, the camera lens assembly of the present disclosure may satisfy the conditional expression $1 < |f/f1| + |f/f2| < 1.55$. Here, f is the total effective focal length of the camera lens assembly, and f1 is the effective focal length of the first lens, and f2 is the effective focal length of the second lens. More specifically, f, f1, and f2 may further satisfy: $1.20 < |f/f1| + |f/f2| < 1.55$, for example, $1.25 \le |f/f1| + |f/f2| \le 1.51$. By reasonably setting the refractive power of the first lens and the refractive power of the second lens, the optical deflection angle may be reduced, thereby reducing the sensitivity of the imaging system.

In the exemplary implementations, the camera lens assembly of the present disclosure may satisfy the conditional expression $0.6 < f6/TTL < 1.3$. Here, f6 is the effective focal length of the sixth lens, and TTL is the total track length of the camera lens assembly (i.e., the distance on the optical axis from the center of the object-side surface of the first lens to the image plane of the camera lens assembly). More specifically, f6 and TTL may further satisfy: $0.6 < f6/TTL < 0.8$, for example, $0.69 \le f6/TTL \le 0.78$. By reasonably controlling the ratio of f6 to TTL, the imaging system may fulfill the requirement of compact size.

In the exemplary implementations, the camera lens assembly of the present disclosure may satisfy the conditional expression $TTL/ImgH < 1.65$. Here, TTL is the total track length of the camera lens assembly, and ImgH is the half of the diagonal length of the effective pixel area on the image plane of the camera lens assembly. More specifically, TTL and ImgH may further satisfy: $1.37 \le TTL/ImgH \le 1.54$. When the conditional expression $TTL/ImgH < 1.65$ is satisfied, the size of the imaging system may be effectively compressed, thereby ensuring the miniaturization characteristic of the lens assembly.

In the exemplary implementations, the camera lens assembly of the present disclosure may satisfy the conditional expression $2 < f/R1 < 2.6$. Here, f is the total effective focal length of the camera lens assembly, and R1 is the radius of curvature of the object-side surface of the first lens. More specifically, f and R1 may further satisfy: $2.06 \le f/R1 \le 2.51$. By reasonably setting the radius of curvature of the first lens, the aberrations of the imaging system may be easily balanced, thereby improving the optical performance of the imaging system.

In the exemplary implementations, the camera lens assembly of the present disclosure may satisfy the conditional expression $1.3 < R2/f1 < 2$. Here, R2 is the radius of curvature of the image-side surface of the first lens, and f1 is the effective focal length of the first lens. More specifically, R2 and f1 may further satisfy: $1.4 < R2/f1 < 1.9$, for example, $1.48 \le R2/f1 \le 1.82$. By reasonably controlling the ratio of R2 to f1, the deflection angle of the light of the edge field at the first lens can be effectively controlled, and thus the sensitivity of the system can be effectively reduced.

In the exemplary implementations, the camera lens assembly of the present disclosure may satisfy the conditional expression $1 < R1/R14 < 1.5$. Here, R1 is the radius of curvature of the object-side surface of the first lens, and R14 is the radius of curvature of the image-side surface of the seventh lens. More specifically, R1 and R14 may further satisfy: $1.10 \le R1/R14 < 1.40$, for example, $1.10 \le R1/R14 \le 1.31$. By reasonably controlling the ratio of R1 to R14, the aberrations of the imaging system may be effectively balanced.

In the exemplary implementations, the camera lens assembly of the present disclosure may satisfy the conditional expression $-5 < f7/CT7 < -4$. Here, f7 is the effective focal length of the seventh lens, and CT7 is the center thickness of the seventh lens on the optical axis. More specifically, f7 and CT7 may further satisfy: $-4.6 < f7/CT7 < -4.3$, for example, $-4.55 \le f7/CT7 \le -4.35$. By reasonably controlling the ratio of f7 to CT7, the size of the back end of the imaging system can be effectively reduced.

In the exemplary implementations, the camera lens assembly of the present disclosure may satisfy the conditional expression $1 < CT3/CT4 < 1.5$. Here, CT3 is the center thickness of the third lens on the optical axis, and CT4 is the center thickness of the fourth lens on the optical axis. More specifically, CT3 and CT4 may further satisfy: $1.1 < CT3/CT4 < 1.4$, for example, $1.14 \le CT3/CT4 \le 1.37$. By reasonably controlling the center thickness of the third lens and the center thickness of the fourth lens, the processability of the third lens and the spherical aberration contribution of the fourth lens can be ensured, so that the axial view field area of the imaging system has a good imaging quality.

In the exemplary implementations, the camera lens assembly of the present disclosure may satisfy the conditional expression $1.5 < T56/T67 < 3.2$. Here, T56 is the spacing distance on the optical axis between the fifth lens and the sixth lens, and T67 is the spacing distance on the optical axis between the sixth lens and the seventh lens. More specifically, T56 and T67 may further satisfy: $1.9 < T56/T67 < 3.2$, for example, $1.91 \le T56/T67 \le 3.11$. By reasonably controlling the spacing distance on the optical axis between the fifth lens and the sixth lens and the spacing distance on the optical axis between the sixth lens and the seventh lens, it is conductive to ensuring that the imaging system has an appropriate machining gap, and is conductive to ensuring that the imaging system has a good deflection of the optical path.

In the exemplary implementations, the camera lens assembly of the present disclosure may satisfy the conditional expression $CT4/CT5 \le 1$. Here, CT4 is the center thickness of the fourth lens on the optical axis, and CT5 is the center thickness of the fifth lens on the optical axis. More specifically, CT4 and CT5 may further satisfy: $0 < CT4/CT5 \le 1$, and further, CT4 and CT5 may satisfy: $0.50 \le CT4/CT5 \le 1$, for example, $0.50 \le CT4/CT5 \le 0.99$. By reasonably controlling the center thickness of the fourth lens and the center thickness of the fifth lens, the processability of the fourth lens and the spherical aberration contribution of the fifth lens can be ensured, so that the axial view field area of the imaging system has a good imaging quality.

In the exemplary implementations, the camera lens assembly of the present disclosure may satisfy the conditional expression $0.8 < DT11/DT51 < 1.2$. Here, DT11 is the effective semi-diameter of the object-side surface of the first lens, and DT51 is the effective semi-diameter of the object-side surface of the fifth lens. More specifically, DT11 and DT51 may further satisfy: $0.9 < DT11/DT51 < 1.1$, for example, $0.97 \le DT11/DT51 \le 1.05$. By reasonably controlling the effective semi-diameter of the object-side surface of the first lens and the effective semi-diameter of the object-side surface of the fifth lens, the deflection angle of the edge field at the first lens and the deflection angle of the edge field at the fifth lens can be reasonably controlled, and thus the sensitivity of the imaging system can be effectively reduced.

In the exemplary implementations, the camera lens assembly of the present disclosure may satisfy the conditional expression $-0.5<SAG71/CT7<0$. Here, SAG71 is the distance on the optical axis from the intersection point between the object-side surface of the seventh lens and the optical axis to the vertex of the effective semi-diameter of the object-side surface of the seventh lens, and CT7 is the center thickness of the seventh lens on the optical axis. More specifically, SAG71 and CT7 may further satisfy: $-0.5<SAG71/CT7<-0.1$, for example, $-0.45 \leq SAG71/CT7 \leq -0.19$. By reasonably controlling the ratio of SAG71 to CT7, the third-order comatic aberration of the seventh lens can be controlled within a reasonable range, so that the comatic aberration generated by the seventh lens can be used to balance the amount of the comatic aberrations generated by the lenses at the front end (i.e., the lenses between the the object side and the seventh lens), and thus the imaging system has a good imaging quality.

In the exemplary implementations, the camera lens assembly may further include at least one diaphragm, to improve the imaging quality of the lens assembly. The diaphragm may be disposed at any position between the object side and the image side as needed. For example, the diaphragm may be disposed between the first lens and the second lens.

Alternatively, the camera lens assembly may further include an optical filter for correcting color deviations and/or a protective glass for protecting a photosensitive element on the image plane.

The camera lens assembly according to the above implementations of the present disclosure may use multiple lenses, for example, seven lenses described above. By reasonably setting the refractive powers and the surface types of the lenses, the center thicknesses of the lenses, the axial spacing distances between the lenses, etc., the size of the lens assembly may be effectively reduced, the sensitivity of the lens assembly may effectively be reduced, and the processability of the lens assembly may effectively be improved, thus making the camera lens assembly more conductive to the production and processing and applicable to the portable electronic products. Meanwhile, the camera lens assembly with the above configuration may further have beneficial effects such as ultra-thin, miniaturization, large-aperture, and high imaging quality.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the camera lens assembly without departing from the technical solution claimed by the present disclosure. For example, although the camera lens assembly having seven lenses is described as an example in the implementations, the camera lens assembly is not limited to include seven lenses. If desired, the camera lens assembly may also include other numbers of lenses.

Specific embodiments of the camera lens assembly that may be applied to the above implementations are further described below with reference to the accompanying drawings.

Embodiment 1

A camera lens assembly according to Embodiment 1 of the present disclosure is described below with reference to FIGS. 1-2D. FIG. 1 is a schematic structural diagram illustrating the camera lens assembly according to Embodiment 1 of the present disclosure.

As shown in FIG. 1, the camera lens assembly according to the exemplary implementations of the present disclosure includes, sequentially along an optical axis from an object side to an image side, a first lens L1, a diaphragm STO, a second lens L2, a third lens L3, a fourth lens L4, a fifth lens L5, a sixth lens L6, a seventh lens L7, an optical filter L8, and an image plane S17.

The first lens L1 has a positive refractive power, an object-side surface S1 of the first lens L1 is a convex surface, and an image-side surface S2 of the first lens L1 is a concave surface. The second lens L2 has a negative refractive power, an object-side surface S3 of the second lens L2 is a convex surface, and an image-side surface S4 of the second lens L2 is a concave surface. The third lens l3 has a positive refractive power, an object-side surface S5 of the third lens L3 is a convex surface, and an image-side surface S6 of the third lens L3 is a concave surface. The fourth lens L4 has a negative refractive power, an object-side surface S7 of the fourth lens L4 is a convex surface, and an image-side surface S8 of the fourth lens L4 is a concave surface. The fifth lens L5 has a positive refractive power, an object-side surface S9 of the fifth lens L5 is a convex surface, and an image-side surface S10 of the fifth lens L5 is a concave surface. The sixth lens L6 has a positive refractive power, an object-side surface S11 of the sixth lens L6 is a convex surface, and an image-side surface S12 of the sixth lens L6 is a convex surface. The seventh lens L7 has a negative refractive power, an object-side surface S13 of the seventh lens L7 is a convex surface, and an image-side surface S14 of the seventh lens L7 is a concave surface. The optical filter L8 has an object-side surface S15 and an image-side surface S16. Light from an object sequentially passes through the surfaces S1-S16 and finally forms an image on the image plane S17.

Table 1 shows the surface type, the radius of curvature, the thickness, the material and the conic coefficient of each lens of the camera lens assembly in Embodiment 1. The units of the radius of curvature and the thickness are both millimeters (mm).

TABLE 1

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.6136 | 0.6191 | 1.55 | 56.1 | −0.2177 |
| S2 | aspheric | 5.8252 | 0.0821 | | | −23.5705 |
| STO | spherical | infinite | 0.0300 | | | |
| S3 | aspheric | 2.5610 | 0.2300 | 1.67 | 20.4 | −11.6904 |
| S4 | aspheric | 1.7039 | 0.2312 | | | −1.8328 |
| S5 | aspheric | 4.4365 | 0.2386 | 1.54 | 56.0 | −46.5754 |
| S6 | aspheric | 9.0819 | 0.1484 | | | −99.0000 |
| S7 | aspheric | 25.4914 | 0.2100 | 1.55 | 56.1 | 99.0000 |

TABLE 1-continued

| surface number | surface type | radius of curvature | thickness | material refractive index | abbe number | conic coefficient |
|---|---|---|---|---|---|---|
| S8 | aspheric | 10.9525 | 0.1478 | | | −99.0000 |
| S9 | aspheric | 1.8074 | 0.2120 | 1.67 | 20.4 | −61.4726 |

TABLE 1-continued

| surface number | surface type | radius of curvature | thickness | material refractive index | abbe number | conic coefficient |
|---|---|---|---|---|---|---|
| S10 | aspheric | 2.0000 | 0.3000 | | | −47.7949 |
| S11 | aspheric | 8.5188 | 0.4500 | 1.55 | | 25.1015 |
| S12 | aspheric | −2.4209 | 0.1378 | | 56.1 | −39.8524 |
| S13 | aspheric | 26.4936 | 0.6390 | 1.54 | 55.8 | 96.8100 |
| S14 | aspheric | 1.4603 | 0.2597 | | | −4.6572 |
| S15 | spherical | infinite | 0.2142 | 1.52 | 64.2 | |
| S16 | spherical | infinite | 0.3500 | | | |
| S17 | spherical | infinite | | | | |

As may be obtained from Table 1, the object-side surface and the image-side surface of each lens in the first to seventh lenses L1-L7 are both aspheric surfaces. In this embodiment, the surface type x of each aspheric surface may be defined using, but not limited to, the following formula:

$$x = \frac{ch^2}{1 + \sqrt{1 - (k+1)c^2 h^2}} + \Sigma A_i h^i. \quad (1)$$

Here, x is the sag from the vertex of the aspheric surface, when the aspheric surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the $i^{th}$ order correction coefficient of the aspheric surface. Table 2 below shows the high-order coefficients $A_4$, $A_6$, $A_8$, $A_{10}$, $A_{12}$, $A_{14}$, $A_{16}$, $A_{18}$, and $A_{20}$ applicable to the aspheric surfaces S1-S14 in Embodiment 1.

TABLE 2

| surface number | A4 | A6 | A8 | A10 | A12 |
|---|---|---|---|---|---|
| S1 | −3.2510E−02 | 2.7649E−01 | −1.1950E+00 | 2.9877E+00 | −4.6362E+00 |
| S2 | −4.2699E−02 | −5.2153E−01 | 3.6451E+00 | −1.2234E+01 | 2.4201E+01 |
| S3 | −2.0269E−01 | 1.0594E+00 | −5.6930E+00 | 2.0993E+01 | −4.8444E+01 |
| S4 | −2.6261E−02 | −8.8568E−01 | 8.4026E+00 | −3.8786E+01 | 1.0835E+02 |
| S5 | −5.1076E−02 | 1.0895E+00 | −8.6595E+00 | 3.7846E+01 | −1.0212E+02 |
| S6 | −1.2113E−01 | 6.2936E−01 | −3.5422E+00 | 1.2074E+01 | −2.7558E+01 |
| S7 | −2.8963E−01 | 1.5154E+00 | −7.2490E+00 | 2.0903E+01 | −3.8121E+01 |
| S8 | −6.2172E−01 | 2.7484E+00 | −9.8942E+00 | 2.3201E+01 | −3.5125E+01 |
| S9 | 6.7447E−03 | −8.1883E−01 | 2.6274E+00 | −4.9504E+00 | 6.3252E+00 |
| S10 | −7.0290E−02 | −2.4344E−01 | 4.9701E−01 | −5.2363E−01 | 5.3066E−01 |
| S11 | 5.3341E−02 | 1.1931E−01 | −3.8251E−01 | 2.9748E−01 | −5.1412E−02 |
| S12 | 3.7899E−02 | 4.0393E−01 | −6.7321E−01 | 5.1170E−01 | −2.2628E−01 |
| S13 | −4.5666E−02 | −1.2536E−01 | 2.0002E−01 | −1.1851E−01 | 3.7082E−02 |
| S14 | −1.1549E−01 | 5.8679E−02 | −2.8312E−02 | 1.2142E−02 | −4.4883E−03 |

| surface number | A14 | A16 | A18 | A20 |
|---|---|---|---|---|
| S1 | 4.4974E+00 | −2.6599E+00 | 8.7574E−01 | −1.2323E−01 |
| S2 | −2.9422E+01 | 2.1581E+01 | −8.7654E+00 | 1.5141E+00 |
| S3 | 6.9649E+01 | −6.0599E+01 | 2.9193E+01 | −5.9756E+00 |
| S4 | −1.8811E+02 | 1.9826E+02 | −1.1609E+02 | 2.8978E+01 |
| S5 | 1.7180E+02 | −1.7598E+02 | 1.0054E+02 | −2.4538E+01 |
| S6 | 4.1451E+01 | −3.9979E+01 | 2.2573E+01 | −5.6093E+00 |
| S7 | 4.3966E+01 | −3.1651E+01 | 1.3359E+01 | −2.5698E+00 |
| S8 | 3.3444E+01 | −1.9163E+01 | 5.9476E+00 | −7.4437E−01 |
| S9 | −5.4795E+00 | 2.9656E+00 | −8.7877E−01 | 1.0730E−01 |
| S10 | −5.3210E−01 | 3.4405E−01 | −1.1352E−01 | 1.4655E−02 |
| S11 | −8.9953E−02 | 7.6338E−02 | −2.5020E−02 | 3.0989E−03 |
| S12 | 6.1508E−02 | −1.0192E−02 | 9.4969E−04 | −3.8218E−05 |
| S13 | −6.6831E−03 | 6.9106E−04 | −3.7373E−05 | 7.8434E−07 |
| S14 | 1.1728E−03 | −1.8695E−04 | 1.6097E−05 | −5.7253E−07 |

Table 3 shows the total effective focal length f of the camera lens assembly in Embodiment 1, the effective focal lengths f1-f7 of the lenses, the total track length TTL (i.e., the distance on the optical axis from the center of the object-side surface S1 of the first lens L1 to the image plane S17) of the camera lens assembly, and the half ImgH of the diagonal length of the effective pixel area on the image plane S17.

TABLE 3

| parameter | f (mm) | f1 (mm) | f2 (mm) | f3 (mm) | f4 (mm) |
|---|---|---|---|---|---|
| numerical value | 3.33 | 3.89 | −8.56 | 15.59 | −35.36 |

| parameter | f5 (mm) | f6 (mm) | f7 (mm) | TTL (mm) | ImgH (mm) |
|---|---|---|---|---|---|
| numerical value | 19.56 | 3.50 | −2.91 | 4.50 | 2.93 |

The camera lens assembly in Embodiment 1 satisfies:

f/EPD=1.51, where f is the total effective focal length of the camera lens assembly, and EPD is the entrance pupil diameter of the camera lens assembly;

f2/f=−2.57, where f2 is the effective focal length of the second lens L2, and f is the total effective focal length of the camera lens assembly;

$|f/f1|+|f/f2|=1.25$, where f is the total effective focal length of the camera lens assembly, f1 is the effective focal length of the first lens L1, and f2 is the effective focal length of the second lens L2;

$f6/TTL=0.78$, where f6 is the effective focal length of the sixth lens L6, and TTL is the total track length of the camera lens assembly;

$TTL/ImgH=1.54$, where TTL is the total track length of the camera lens assembly, and ImgH is the half of the diagonal length of the effective pixel area on the image plane S17;

$f/R1=2.06$, where f is the total effective focal length of the camera lens assembly, and R1 is the radius of curvature of the object-side surface S1 of the first lens L1;

$R2/f1=1.50$, where R2 is the radius of curvature of the image-side surface S2 of the first lens L1, and f1 is the effective focal length of the first lens L1;

$R1/R14=1.10$, where R1 is the radius of curvature of the object-side surface S1 of the first lens L1, and R14 is the radius of curvature of the image-side surface S14 of the seventh lens L7;

$f7/CT7=-4.55$, where f7 is the effective focal length of the seventh lens L7, and CT7 is the center thickness of the seventh lens L7 on the optical axis;

$CT3/CT4=1.14$, where CT3 is the center thickness of the third lens L3 on the optical axis, and CT4 is the center thickness of the fourth lens L4 on the optical axis;

$T56/T67=2.18$, where T56 is the spacing distance on the optical axis between the fifth lens L5 and the sixth lens L6, and T67 is the spacing distance on the optical axis between the sixth lens L6 and the seventh lens L7;

$CT4/CT5=0.99$, where CT4 is the center thickness of the fourth lens L4 on the optical axis, and CT5 is the center thickness of the fifth lens L5 on the optical axis;

$DT11/DT51=1.00$, where DT11 is the effective semi-diameter of the object-side surface S1 of the first lens L1, and DT51 is the effective semi-diameter of the object-side surface S9 of the fifth lens L5; and $SAG71/CT7=-0.19$, where SAG71 is the distance on the optical axis from the intersection point between the object-side surface S13 of the seventh lens L7 and the optical axis to the vertex of the effective semi-diameter of the object-side surface S13 of the seventh lens L7, and CT7 is the center thickness of the seventh lens L7 on the optical axis.

Figures 2A, 2B:
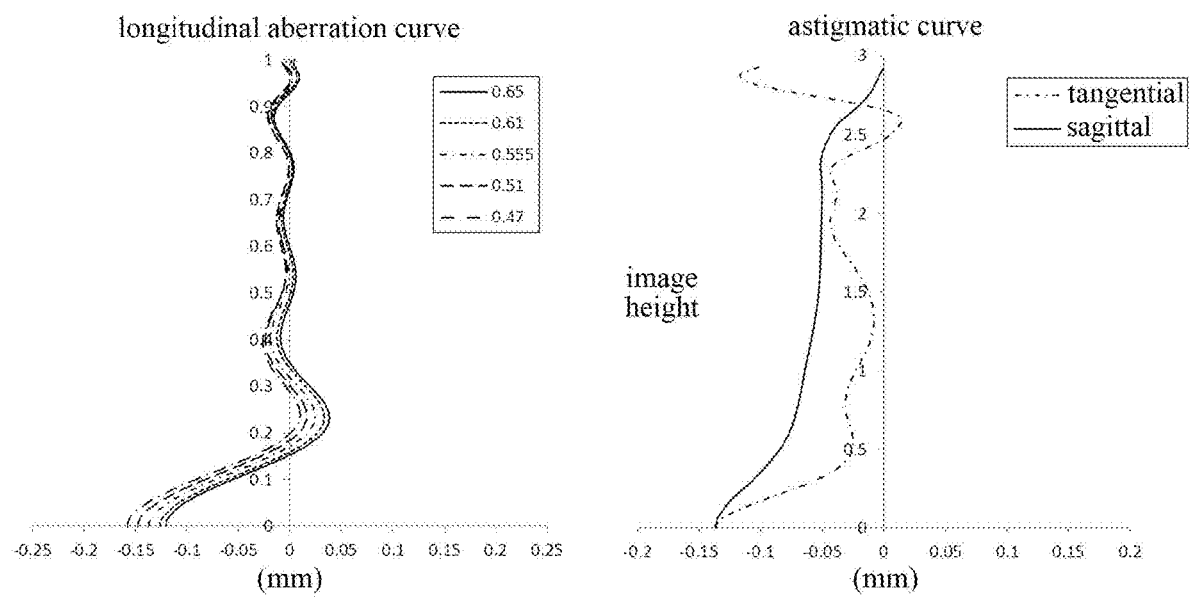
FIGS. 2A-2D respectively illustrate a longitudinal aberration curve, an astigmatic curve, a distortion curve, and a lateral color curve of the camera lens assembly according to Embodiment 1.
Figures 2C, 2D:
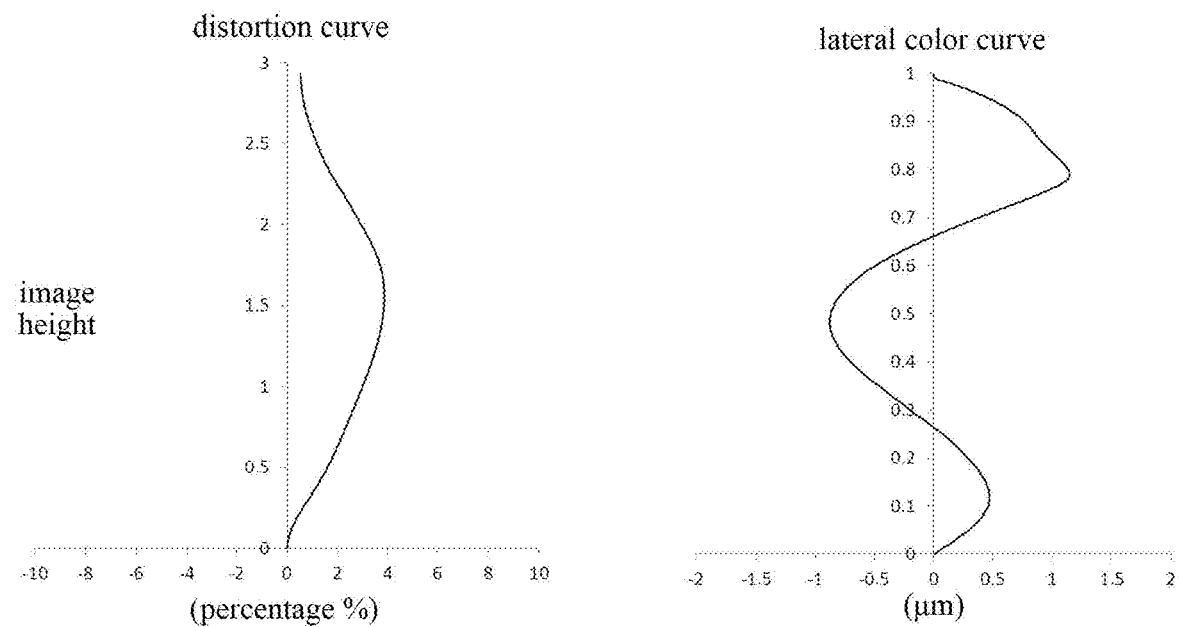

FIG. 2A illustrates the longitudinal aberration curve of the camera lens assembly according to Embodiment 1, representing deviations of focal points where lights of different wavelengths converge after passing through the lens assembly. FIG. 2B illustrates the astigmatic curve of the camera lens assembly according to Embodiment 1, representing a curvature of the tangential image plane and a curvature of the sagittal image plane. FIG. 2C illustrates the distortion curve of the camera lens assembly according to Embodiment 1, representing degrees of distortion at different viewing angles. FIG. 2D illustrates the lateral color curve of the camera lens assembly according to Embodiment 1, representing deviations of different heights of images formed on the image plane by light passing through the lens assembly. It can be seen from FIGS. 2A-2D that the camera lens assembly according to Embodiment 1 can achieve a good imaging quality.

Embodiment 2

Figure 3:
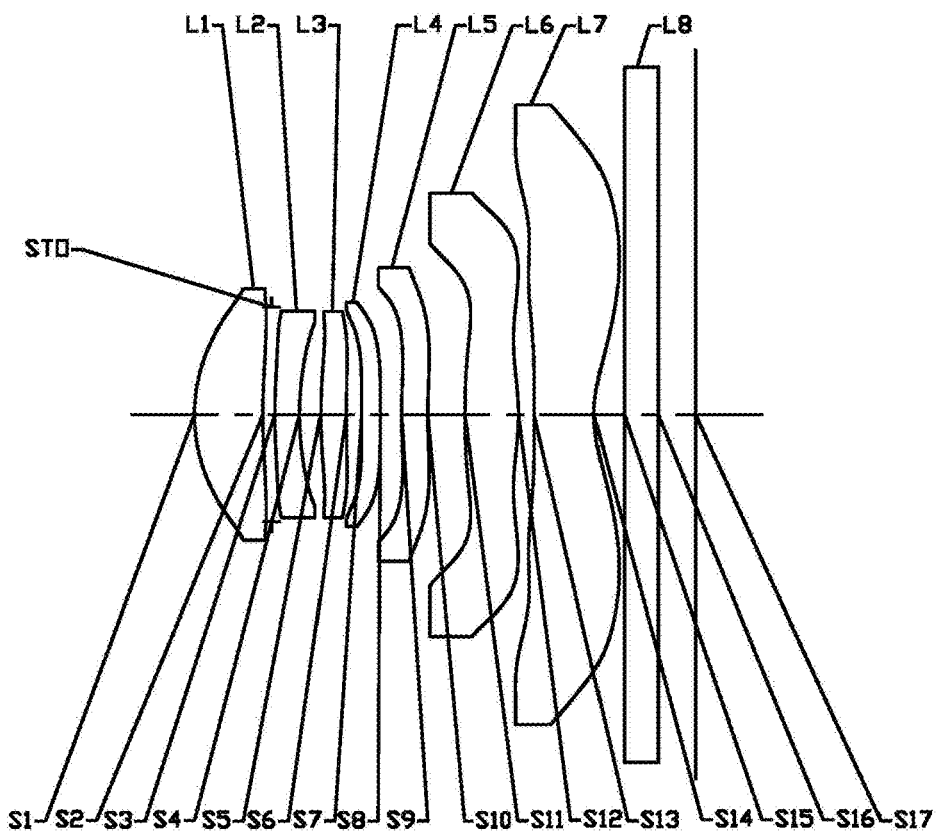
FIG. 3 is a schematic structural diagram illustrating a camera lens assembly according to Embodiment 2 of the present disclosure.

A camera lens assembly according to Embodiment 2 of the present disclosure is described below with reference to FIGS. 3-4D. In this embodiment and the following embodiments, for the purpose of brevity, the description of parts similar to those in Embodiment 1 will be omitted. FIG. 3 is a schematic structural diagram illustrating the camera lens assembly according to Embodiment 2 of the present disclosure.

As shown in FIG. 3, the camera lens assembly according to the exemplary implementations of the present disclosure includes, sequentially along an optical axis from an object side to an image side, a first lens L1, a diaphragm STO, a second lens L2, a third lens L3, a fourth lens L4, a fifth lens L5, a sixth lens L6, a seventh lens L7, an optical filter L8, and an image plane S17.

The first lens L1 has a positive refractive power, an object-side surface S1 of the first lens L1 is a convex surface, and an image-side surface S2 of the first lens L1 is a concave surface. The second lens L2 has a negative refractive power, an object-side surface S3 of the second lens L2 is a convex surface, and an image-side surface S4 of the second lens L2 is a concave surface. The third lens l3 has a positive refractive power, an object-side surface S5 of the third lens L3 is a convex surface, and an image-side surface S6 of the third lens L3 is a concave surface. The fourth lens L4 has a negative refractive power, an object-side surface S7 of the fourth lens L4 is a convex surface, and an image-side surface S8 of the fourth lens L4 is a concave surface. The fifth lens L5 has a negative refractive power, an object-side surface S9 of the fifth lens L5 is a convex surface, and an image-side surface S10 of the fifth lens L5 is a concave surface. The sixth lens L6 has a positive refractive power, an object-side surface S11 of the sixth lens L6 is a convex surface, and an image-side surface S12 of the sixth lens L6 is a convex surface. The seventh lens L7 has a negative refractive power, an object-side surface S13 of the seventh lens L7 is a convex surface, and an image-side surface S14 of the seventh lens L7 is a concave surface. The optical filter L8 has an object-side surface S15 and an image-side surface S16. Light from an object sequentially passes through the surfaces S1-S16 and finally forms an image on the image plane S17.

Table 4 shows the surface type, the radius of curvature, the thickness, the material and the conic coefficient of each lens of the camera lens assembly in Embodiment 2. The units of the radius of curvature and the thickness are both millimeters (mm).

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5657 | 0.6416 | 1.55 | 56.1 | −0.1748 |
| S2 | aspheric | 5.7110 | 0.0829 | | | −20.6308 |
| STO | spherical | infinite | 0.0300 | | | |
| S3 | aspheric | 5.1765 | 0.2300 | 1.67 | 20.4 | −17.0411 |
| S4 | aspheric | 2.6595 | 0.1960 | | | −1.8014 |
| S5 | aspheric | 5.2988 | 0.2376 | 1.59 | 32.3 | −53.0223 |
| S6 | aspheric | 14.2581 | 0.1447 | | | −99.0000 |
| S7 | aspheric | 99.0000 | 0.1738 | 1.55 | 56.1 | −99.0000 |
| S8 | aspheric | 37.7235 | 0.2000 | | | 99.0000 |
| S9 | aspheric | 5.2969 | 0.2456 | 1.67 | 20.4 | −97.1258 |
| S10 | aspheric | 5.1082 | 0.3500 | | | −88.7461 |
| S11 | aspheric | 12.7331 | 0.5000 | 1.55 | 56.1 | 53.6722 |
| S12 | aspheric | −2.2040 | 0.1460 | | | −28.1217 |
| S13 | aspheric | 30.4803 | 0.5600 | 1.54 | 55.8 | 93.9446 |
| S14 | aspheric | 1.2564 | 0.2834 | | | −7.0783 |
| S15 | spherical | infinite | 0.3164 | 1.52 | 64.2 | |

TABLE 4-continued

| surface number | surface type | radius of curvature | thickness | material refractive index | abbe number | conic coefficient |
|---|---|---|---|---|---|---|
| S16 | spherical | infinite | 0.3500 | | | |
| S17 | spherical | infinite | | | | |

As may be obtained from Table 4, in Embodiment 2, the object-side surface and the image-side surface of each lens in the first to seventh lenses L1-L7 are both aspheric surfaces. Table 5 shows the high-order coefficients applicable to each aspheric surface in Embodiment 2. The surface type of each aspheric surface may be defined by the formula (1) given in Embodiment 1.

TABLE 5

| surface number | A4 | A6 | A8 | A10 | A12 |
|---|---|---|---|---|---|
| S1 | −1.3930E−02 | 1.2714E−01 | −5.1925E−01 | 1.2275E+00 | −1.8043E+00 |
| S2 | −5.6505E−02 | −1.7634E−01 | 1.3081E+00 | −4.2093E+00 | 7.9293E+00 |
| S3 | −1.6659E−01 | 4.1678E−01 | −1.5096E+00 | 5.4679E+00 | −1.2747E+01 |
| S4 | −3.8892E−02 | −5.2915E−01 | 5.7519E+00 | −2.8088E+01 | 8.3374E+01 |
| S5 | 3.8886E−03 | 1.9758E−01 | −2.2826E+00 | 1.0874E+01 | −3.1706E+01 |
| S6 | −3.8996E−02 | 8.6322E−02 | −1.1008E+00 | 5.5385E+00 | −1.7730E+01 |
| S7 | −2.0249E−01 | 4.0417E−01 | −2.3143E+00 | 8.5850E+00 | −2.1305E+01 |
| S8 | −2.2043E−01 | 3.4174E−02 | 6.8110E−01 | −3.4629E+00 | 8.7129E+00 |
| S9 | −1.4656E−01 | −8.8763E−02 | 4.2818E−01 | −6.8469E−01 | 7.0294E−01 |
| S10 | −9.2762E−02 | −1.7742E−01 | 4.2695E−01 | −4.7926E−01 | 3.7452E−01 |
| S11 | 1.3903E−01 | −1.7691E−01 | 6.6168E−02 | −4.5795E−02 | 3.5943E−02 |
| S12 | 8.1625E−02 | 2.4137E−01 | −4.6845E−01 | 3.8114E−01 | −1.8008E−01 |
| S13 | −1.1350E−01 | 5.6420E−02 | 1.9490E−02 | −2.4697E−02 | 8.8729E−03 |
| S14 | −8.6430E−02 | 4.0138E−02 | −1.2190E−02 | 1.1359E−03 | 4.9128E−04 |

| surface number | A14 | A16 | A18 | A20 |
|---|---|---|---|---|
| S1 | 1.6424E+00 | −9.0159E−01 | 2.6848E−01 | −3.3011E−02 |
| S2 | −9.1646E+00 | 6.3562E+00 | −2.4237E+00 | 3.9005E−01 |
| S3 | 1.8307E+01 | −1.5731E+01 | 7.4238E+00 | −1.4767E+00 |
| S4 | −1.5413E+02 | 1.7297E+02 | −1.0777E+02 | 2.8618E+01 |
| S5 | 5.7209E+01 | −6.2577E+01 | 3.8013E+01 | −9.8046E+00 |
| S6 | 3.4625E+01 | −4.0406E+01 | 2.5925E+01 | −6.9715E+00 |
| S7 | 3.4109E+01 | −3.4337E+01 | 1.9915E+01 | −5.0068E+00 |
| S8 | −1.3417E+01 | 1.2462E+01 | −6.3563E+00 | 1.3696E+00 |
| S9 | −6.5986E−01 | 4.8562E−01 | −2.1200E−01 | 4.0018E−02 |
| S10 | −2.5014E−01 | 1.2912E−01 | −3.8932E−02 | 4.8109E−03 |
| S11 | −1.3582E−02 | 6.3155E−05 | 1.3660E−03 | −2.5829E−04 |
| S12 | 5.2536E−02 | −9.3893E−03 | 9.4866E−04 | −4.1631E−05 |
| S13 | −1.6480E−03 | 1.7235E−04 | −9.6759E−06 | 2.2795E−07 |
| S14 | −1.8384E−04 | 2.6278E−05 | −1.7702E−06 | 4.6443E−08 |

Table 6 shows the total effective focal length f of the camera lens assembly in Embodiment 2, the effective focal lengths f1-f7 of the lenses, the total track length TTL of the camera lens assembly, and the half ImgH of the diagonal length of the effective pixel area on the image plane S17.

TABLE 6

| parameter | f (mm) | f1 (mm) | f2 (mm) | f3 (mm) | f4 (mm) |
|---|---|---|---|---|---|
| numerical value | 3.80 | 3.75 | −8.52 | 14.07 | −111.75 |

| parameter | f5 (mm) | f6 (mm) | f7 (mm) | TTL (mm) | ImgH (mm) |
|---|---|---|---|---|---|
| numerical value | −448.40 | 3.48 | −2.46 | 4.69 | 3.41 |

Figure 4A:
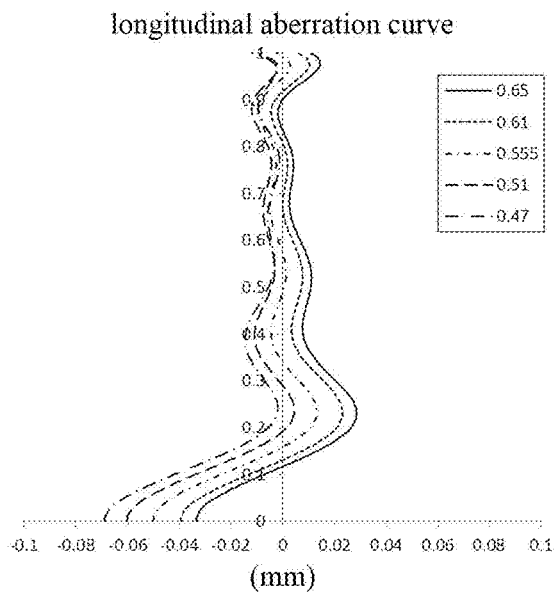
FIGS. 4A-4D respectively illustrate a longitudinal aberration curve, an astigmatic curve, a distortion curve, and a lateral color curve of the camera lens assembly according to Embodiment 2.
Figure 4B:
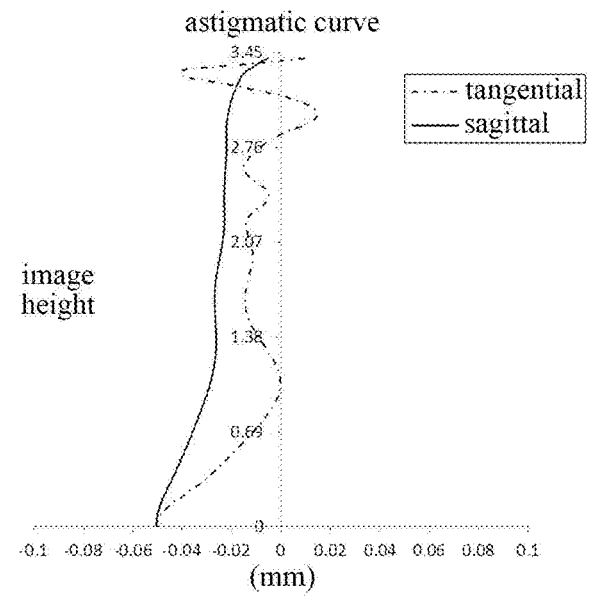
Figure 4C:
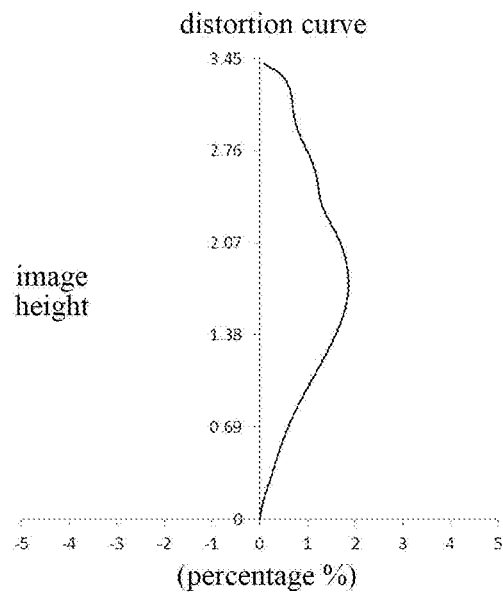
Figure 4D:
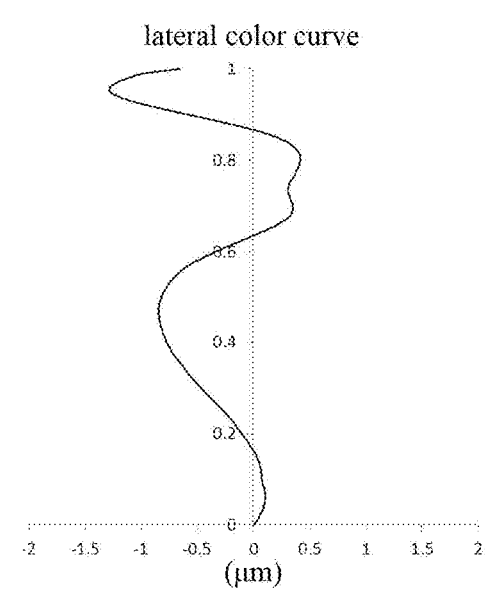

FIG. 4A illustrates the longitudinal aberration curve of the camera lens assembly according to Embodiment 2, representing deviations of focal points where lights of different wavelengths converge after passing through the lens assembly. FIG. 4B illustrates the astigmatic curve of the camera lens assembly according to Embodiment 2, representing a curvature of the tangential image plane and a curvature of the sagittal image plane. FIG. 4C illustrates the distortion curve of the camera lens assembly according to Embodiment 2, representing degrees of distortion at different viewing angles. FIG. 4D illustrates the lateral color curve of the camera lens assembly according to Embodiment 2, representing deviations of different heights of images formed on the image plane by light passing through the lens assembly. It can be seen from FIGS. 4A-4D that the camera lens assembly according to Embodiment 2 can achieve a good imaging quality.

Embodiment 3

Figure 5:
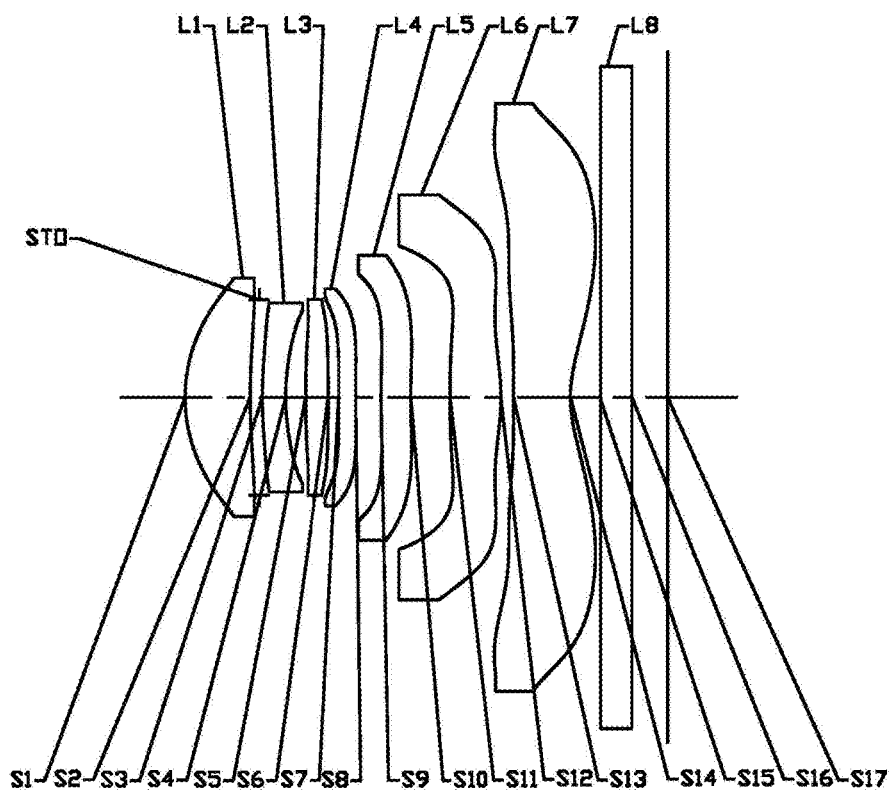
FIG. 5 is a schematic structural diagram illustrating a camera lens assembly according to Embodiment 3 of the present disclosure.

A camera lens assembly according to Embodiment 3 of the present disclosure is described below with reference to FIGS. 5-6D. FIG. 5 is a schematic structural diagram illustrating the camera lens assembly according to Embodiment 3 of the present disclosure.

As shown in FIG. 5, the camera lens assembly according to the exemplary implementations of the present disclosure includes, sequentially along an optical axis from an object side to an image side, a first lens L1, a diaphragm STO, a second lens L2, a third lens L3, a fourth lens L4, a fifth lens L5, a sixth lens L6, a seventh lens L7, an optical filter L8, and an image plane S17.

The first lens L1 has a positive refractive power, an object-side surface S1 of the first lens L1 is a convex surface, and an image-side surface S2 of the first lens L1 is a concave surface. The second lens L2 has a negative refractive power, an object-side surface S3 of the second lens L2 is a convex surface, and an image-side surface S4 of the second lens L2 is a concave surface. The third lens l3 has a positive refractive power, an object-side surface S5 of the third lens L3 is a convex surface, and an image-side surface S6 of the third lens L3 is a convex surface. The fourth lens L4 has a negative refractive power, an object-side surface S7 of the fourth lens L4 is a convex surface, and an image-side surface S8 of the fourth lens L4 is a concave surface. The fifth lens L5 has a negative refractive power, an object-side surface S9 of the fifth lens L5 is a convex surface, and an image-side surface S10 of the fifth lens L5 is a concave surface. The sixth lens L6 has a positive refractive power, an object-side surface S11 of the sixth lens L6 is a convex surface, and an image-side surface S12 of the sixth lens L6 is a convex surface. The seventh lens L7 has a negative refractive power, an object-side surface S13 of the seventh lens L7 is a convex surface, and an image-side surface S14 of the seventh lens L7 is a concave surface. The optical filter L8 has an object-side surface S15 and an image-side surface S16. Light from an object sequentially passes through the surfaces S1-S16 and finally forms an image on the image plane S17.

Table 7 shows the surface type, the radius of curvature, the thickness, the material and the conic coefficient of each lens of the camera lens assembly in Embodiment 3. The units of the radius of curvature and the thickness are both millimeters (mm).

TABLE 7

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5709 | 0.6399 | 1.55 | 56.1 | −0.1124 |

TABLE 7-continued

| surface number | surface type | radius of curvature | thickness | material refractive index | abbe number | conic coefficient |
|---|---|---|---|---|---|---|
| S2 | aspheric | 5.7110 | 0.0895 | | | −12.6703 |
| STO | spherical | infinite | 0.0300 | | | |
| S3 | aspheric | 3.9383 | 0.2300 | 1.67 | 20.4 | −17.5975 |
| S4 | aspheric | 2.2833 | 0.1960 | | | −1.7765 |
| S5 | aspheric | 9.9330 | 0.2280 | 1.55 | 52.6 | −2.7016 |
| S6 | aspheric | −22.4229 | 0.1013 | | | 99.0000 |
| S7 | aspheric | 20.6422 | 0.1680 | 1.55 | 56.1 | −99.0000 |
| S8 | aspheric | 11.1306 | 0.2500 | | | −89.4048 |
| S9 | aspheric | 8.1153 | 0.2932 | 1.67 | 20.4 | −99.0000 |
| S10 | aspheric | 7.8476 | 0.3857 | | | −99.0000 |
| S11 | aspheric | 13.8864 | 0.5000 | 1.55 | 56.1 | 70.4367 |
| S12 | aspheric | −2.2158 | 0.1240 | | | −27.3224 |
| S13 | aspheric | 31.1649 | 0.5600 | 1.54 | 55.8 | 98.4068 |
| S14 | aspheric | 1.2444 | 0.2956 | | | −7.3121 |
| S15 | spherical | infinite | 0.3164 | 1.52 | 64.2 | |
| S16 | spherical | infinite | 0.3500 | | | |
| S17 | spherical | infinite | | | | |

As may be obtained from Table 7, in Embodiment 3, the object-side surface and the image-side surface of each lens in the first to seventh lenses L1-L7 are both aspheric surfaces. Table 8 shows the high-order coefficients applicable to each aspheric surface in Embodiment 3. The surface type of each aspheric surface may be defined by the formula (1) given in Embodiment 1.

TABLE 8

| surface number | A4 | A6 | A8 | A10 | A12 |
|---|---|---|---|---|---|
| S1 | −5.5911E−03 | 5.6993E−02 | −2.2184E−01 | 4.8241E−01 | −6.2517E−01 |
| S2 | −6.3435E−02 | −9.0401E−02 | 9.3071E−01 | −3.3366E+00 | 6.9764E+00 |
| S3 | −1.3763E−01 | 2.4572E−01 | −8.5397E−01 | 3.8156E+00 | −1.0458E+01 |
| S4 | −4.8742E−02 | −1.9081E−01 | 2.5148E+00 | −1.1954E+01 | 3.5173E+01 |
| S5 | 2.3251E−02 | −4.8838E−02 | −7.9351E−02 | −1.0273E−01 | 1.4180E+00 |
| S6 | 4.3942E−03 | −9.5442E−02 | 3.1352E−02 | 6.7082E−01 | −4.8760E+00 |
| S7 | −1.7407E−01 | 2.6241E−01 | −1.8288E+00 | 7.5941E+00 | −2.1063E+01 |
| S8 | −1.7192E−01 | 7.8399E−02 | −6.1871E−02 | −2.7147E−01 | 4.6371E−01 |
| S9 | −1.2206E−01 | −4.6193E−03 | 3.0401E−01 | −8.8319E−01 | 1.4215E+00 |
| S10 | −1.1471E−01 | −2.1695E−02 | 1.6498E−01 | −2.4888E−01 | 2.1787E−01 |
| S11 | 7.0700E−02 | −7.5491E−02 | −1.3111E−01 | 3.5891E−01 | −5.3010E−01 |
| S12 | 2.8159E−02 | 2.5744E−01 | −4.0394E−01 | 2.8852E−01 | −1.2267E−01 |
| S13 | −1.5745E−01 | 1.7350E−01 | −8.9997E−02 | 2.6853E−02 | −5.1141E−03 |
| S14 | −9.3938E−02 | 5.9791E−02 | −2.8644E−02 | 9.2467E−03 | −2.0062E−03 |

| surface number | A14 | A16 | A18 | A20 |
|---|---|---|---|---|
| S1 | 4.6334E−01 | −1.7960E−01 | 2.4369E−02 | 1.4495E−03 |
| S2 | −8.9958E+00 | 7.0024E+00 | −3.0174E+00 | 5.5262E−01 |
| S3 | 1.7273E+01 | −1.6993E+01 | 9.1935E+00 | −2.1065E+00 |
| S4 | −6.4942E+01 | 7.3052E+01 | −4.5703E+01 | 1.2214E+01 |
| S5 | −4.0717E+00 | 5.5824E+00 | −3.8543E+00 | 1.1331E+00 |
| S6 | 1.4057E+01 | −2.0638E+01 | 1.5337E+01 | −4.5289E+00 |
| S7 | 3.6953E+01 | −3.9063E+01 | 2.2695E+01 | −5.5302E+00 |
| S8 | −1.2667E−01 | −2.6332E−01 | 2.2955E−01 | −5.5038E−02 |
| S9 | −1.5788E+00 | 1.1469E+00 | −4.7763E−01 | 8.5220E−02 |
| S10 | −1.4256E−01 | 7.0661E−02 | −2.1617E−02 | 2.8383E−03 |
| S11 | 4.6591E−01 | −2.3929E−01 | 6.5971E−02 | −7.5239E−03 |
| S12 | 3.2691E−02 | −5.4518E−03 | 5.3420E−04 | −2.3988E−05 |
| S13 | 6.4778E−04 | −5.3685E−05 | 2.6527E−06 | −5.9242E−08 |
| S14 | 2.9246E−04 | −2.7871E−05 | 1.5705E−06 | −3.9248E−08 |

Table 9 shows the total effective focal length f of the camera lens assembly in Embodiment 3, the effective focal lengths f1-f7 of the lenses, the total track length TTL of the camera lens assembly, and the half ImgH of the diagonal length of the effective pixel area on the image plane S17.

TABLE 9

| parameter | f (mm) | f1 (mm) | f2 (mm) | f3 (mm) | f4 (mm) |
|---|---|---|---|---|---|
| numerical value | 3.95 | 3.76 | −8.63 | 12.54 | −44.52 |
| parameter | f5 (mm) | f6 (mm) | f7 (mm) | TTL (mm) | ImgH (mm) |
| numerical value | −635.02 | 3.54 | −2.43 | 4.76 | 3.41 |

Figures 6A, 6B:
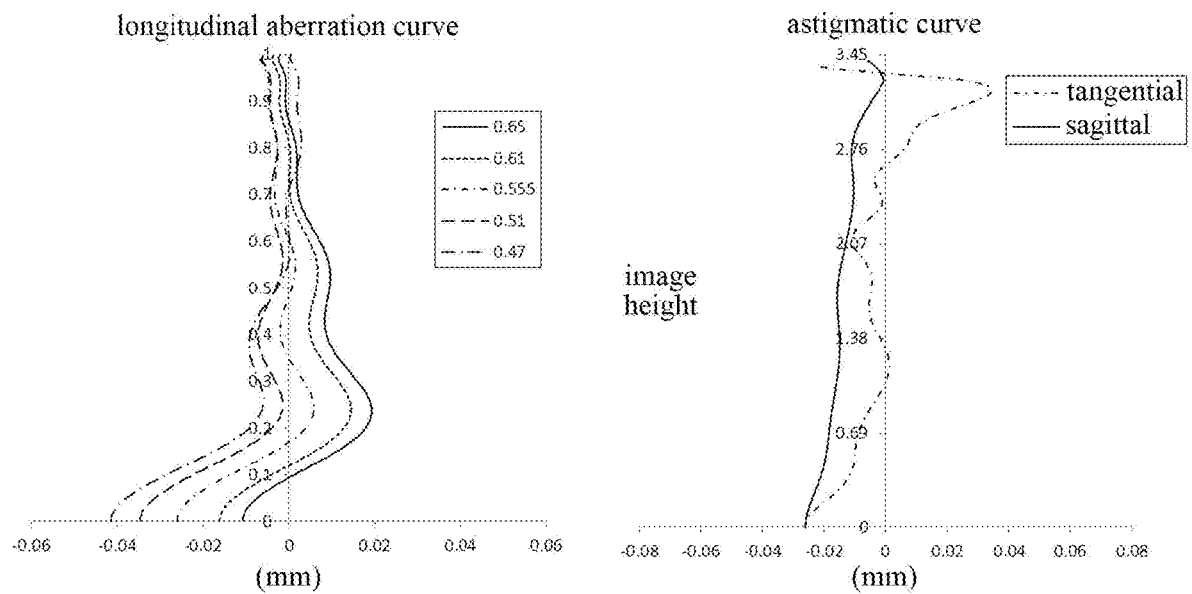
FIGS. 6A-6D respectively illustrate a longitudinal aberration curve, an astigmatic curve, a distortion curve, and a lateral color curve of the camera lens assembly according to Embodiment 3.
Figures 6C, 6D:
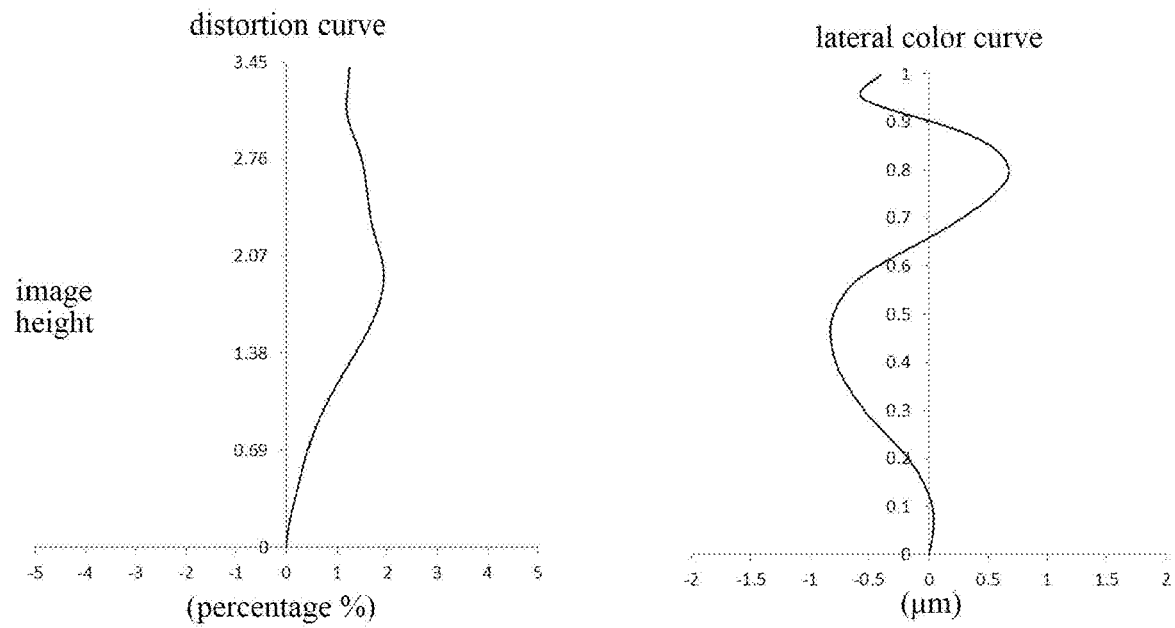

FIG. 6A illustrates the longitudinal aberration curve of the camera lens assembly according to Embodiment 3, representing deviations of focal points where lights of different wavelengths converge after passing through the lens assembly. FIG. 6B illustrates the astigmatic curve of the camera lens assembly according to Embodiment 3, representing a curvature of the tangential image plane and a curvature of the sagittal image plane. FIG. 6C illustrates the distortion curve of the camera lens assembly according to Embodiment 3, representing degrees of distortion at different viewing angles. FIG. 6D illustrates the lateral color curve of the camera lens assembly according to Embodiment 3, representing deviations of different heights of images formed on the image plane by light passing through the lens assembly. It can be seen from FIGS. 6A-6D that the camera lens assembly according to Embodiment 3 can achieve a good imaging quality.

Embodiment 4

Figure 7:
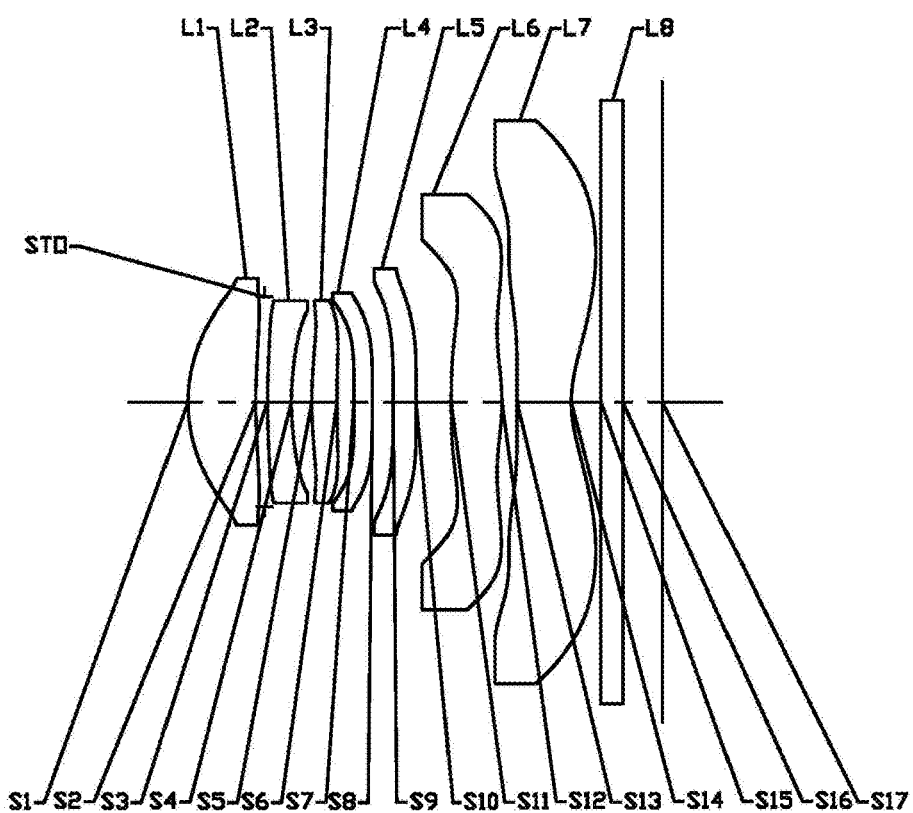
FIG. 7 is a schematic structural diagram illustrating a camera lens assembly according to Embodiment 4 of the present disclosure.

A camera lens assembly according to Embodiment 4 of the present disclosure is described below with reference to FIGS. 7-8D. FIG. 7 is a schematic structural diagram illustrating the camera lens assembly according to Embodiment 4 of the present disclosure.

As shown in FIG. 7, the camera lens assembly according to the exemplary implementations of the present disclosure includes, sequentially along an optical axis from an object side to an image side, a first lens L1, a diaphragm STO, a second lens L2, a third lens L3, a fourth lens L4, a fifth lens L5, a sixth lens L6, a seventh lens L7, an optical filter L8, and an image plane S17.

The first lens L1 has a positive refractive power, an object-side surface S1 of the first lens L1 is a convex surface, and an image-side surface S2 of the first lens L1 is a concave surface. The second lens L2 has a negative refractive power, an object-side surface S3 of the second lens L2 is a convex surface, and an image-side surface S4 of the second lens L2 is a concave surface. The third lens l3 has a positive refractive power, an object-side surface S5 of the third lens L3 is a convex surface, and an image-side surface S6 of the third lens L3 is a concave surface. The fourth lens L4 has a positive refractive power, an object-side surface S7 of the fourth lens L4 is a convex surface, and an image-side surface S8 of the fourth lens L4 is a convex surface. The fifth lens L5 has a negative refractive power, an object-side surface S9 of the fifth lens L5 is a concave surface, and an image-side surface S10 of the fifth lens L5 is a concave surface. The sixth lens L6 has a positive refractive power, an object-side surface S11 of the sixth lens L6 is a convex surface, and an image-side surface S12 of the sixth lens L6 is a convex surface. The seventh lens L7 has a negative refractive power, an object-side surface S13 of the seventh lens L7 is a convex surface, and an image-side surface S14 of the seventh lens L7 is a concave surface. The optical filter L8 has an object-side surface S15 and an image-side surface S16. Light from an object sequentially passes through the surfaces S1-S16 and finally forms an image on the image plane S17.

Table 10 shows the surface type, the radius of curvature, the thickness, the material and the conic coefficient of each lens of the camera lens assembly in Embodiment 4. The units of the radius of curvature and the thickness are both millimeters (mm).

TABLE 10

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.5325 | 0.6519 | 1.55 | 56.1 | −0.1829 |
| S2 | aspheric | 5.7110 | 0.0829 | | | −20.0622 |
| STO | spherical | infinite | 0.0300 | | | |
| S3 | aspheric | 6.1587 | 0.2300 | 1.67 | 20.4 | −6.2425 |
| S4 | aspheric | 2.8559 | 0.1960 | | | −1.2528 |
| S5 | aspheric | 4.3191 | 0.2420 | 1.55 | 51.3 | −55.6442 |
| S6 | aspheric | 8.6557 | 0.1634 | | | −99.0000 |
| S7 | aspheric | 73.5915 | 0.1782 | 1.55 | 56.1 | −61.3442 |
| S8 | aspheric | −96.1754 | 0.2000 | | | −61.3442 |
| S9 | aspheric | −99.0000 | 0.2201 | 1.67 | 20.4 | −99.0000 |
| S10 | aspheric | 40.5378 | 0.3320 | | | −75.3388 |
| S11 | aspheric | 10.2546 | 0.4894 | 1.55 | 56.1 | 35.5660 |
| S12 | aspheric | −2.0331 | 0.1460 | | | −23.7384 |
| S13 | aspheric | 42.1504 | 0.5213 | 1.54 | 55.8 | −91.1959 |
| S14 | aspheric | 1.1928 | 0.2858 | | | −7.0145 |
| S15 | spherical | infinite | 0.2100 | 1.52 | 64.2 | |
| S16 | spherical | infinite | 0.3811 | | | |
| S17 | spherical | infinite | | | | |

As may be obtained from Table 10, in Embodiment 4, the object-side surface and the image-side surface of each lens in the first to seventh lenses L1-L7 are both aspheric surfaces. Table 11 shows the high-order coefficients applicable to each aspheric surface in Embodiment 4. The surface type of each aspheric surface may be defined by the formula (1) given in Embodiment 1.

TABLE 11

| surface number | A4 | A6 | A8 | A10 | A12 |
|---|---|---|---|---|---|
| S1 | 4.8164E−03 | −2.3021E−02 | 1.5498E−01 | −5.4826E−01 | 1.0849E+00 |
| S2 | −6.7109E−02 | −5.9848E−03 | 3.3427E−01 | −1.0865E+00 | 1.8848E+00 |
| S3 | −1.6274E−01 | 4.3061E−01 | −1.5606E+00 | 5.7849E+00 | −1.4188E+01 |
| S4 | −8.0253E−02 | 1.9268E−01 | −2.9574E−01 | 1.9083E+00 | −8.0928E+00 |
| S5 | 4.3668E−02 | −2.5465E−01 | 5.5527E−01 | −4.5213E−01 | −3.6360E+00 |
| S6 | −4.0854E−02 | −1.3633E−01 | −5.7711E−02 | 2.0050E+00 | −9.3998E+00 |
| S7 | −1.7580E−01 | −1.0072E−01 | −7.7022E−01 | 4.3459E+00 | −1.0555E+01 |

TABLE 11-continued

| | | | | | |
|---|---|---|---|---|---|
| S8 | −9.4743E−02 | −4.1414E−01 | 1.2227E+00 | −3.3482E+00 | 8.1258E+00 |
| S9 | −9.5943E−02 | −1.3867E−01 | 3.0293E−01 | −3.3040E−01 | 5.4693E−01 |
| S10 | −1.0166E−01 | −2.5258E−01 | 8.0035E−01 | −1.6688E+00 | 2.6405E+00 |
| S11 | 1.7030E−01 | −2.9779E−01 | 3.4808E−01 | −5.1913E−01 | 5.5585E−01 |
| S12 | 1.4209E−01 | 1.4322E−01 | −4.1090E−01 | 3.7819E−01 | −1.9282E−01 |
| S13 | −8.6610E−02 | −2.6839E−02 | 9.5674E−02 | −5.7412E−02 | 1.5948E−02 |
| S14 | −8.1591E−02 | 2.4774E−02 | 1.8591E−03 | −5.6561E−03 | 2.5195E−03 |

| surface number | A14 | A16 | A18 | A20 |
|---|---|---|---|---|
| S1 | −1.2909E+00 | 9.0825E−01 | −3.5537E−01 | 5.9403E−02 |
| S2 | −2.0491E+00 | 1.3803E+00 | −5.2566E−01 | 8.6393E−02 |
| S3 | 2.1667E+01 | −1.9921E+01 | 1.0137E+01 | −2.1943E+00 |
| S4 | 1.8657E+01 | −2.3920E+01 | 1.6203E+01 | −4.4509E+00 |
| S5 | 1.4178E+01 | −2.3633E+01 | 1.9568E+01 | −6.4551E+00 |
| S6 | 2.1534E+01 | −2.7898E+01 | 1.9695E+01 | −5.8570E+00 |
| S7 | 1.4181E+01 | −1.0959E+01 | 4.6754E+00 | −8.6484E−01 |
| S8 | −1.3764E+01 | 1.4259E+01 | −8.1043E+00 | 1.9463E+00 |
| S9 | −9.0943E−01 | 7.6990E−01 | −2.9377E−01 | 4.0673E−02 |
| S10 | −2.7590E+00 | 1.7221E+00 | −5.7569E−01 | 7.9087E−02 |
| S11 | −3.7079E−01 | 1.4723E−01 | −3.1691E−02 | 2.8361E−03 |
| S12 | 5.9571E−02 | −1.1178E−02 | 1.1808E−03 | −5.4086E−05 |
| S13 | −2.2970E−03 | 1.5882E−04 | −2.9746E−06 | −1.1248E−07 |
| S14 | −5.8048E−04 | 7.5661E−05 | −5.2687E−06 | 1.5224E−07 |

Table 12 shows the total effective focal length f of the camera lens assembly in Embodiment 2, the effective focal lengths f1-f7 of the lenses, the total track length TTL of the camera lens assembly, and the half ImgH of the diagonal length of the effective pixel area on the image plane S17.

TABLE 12

| parameter | f (mm) | f1 (mm) | f2 (mm) | f3 (mm) | f4 (mm) |
|---|---|---|---|---|---|
| numerical value | 3.74 | 3.64 | −8.22 | 15.31 | 76.39 |
| parameter | f5 (mm) | f6 (mm) | f7 (mm) | TTL (mm) | ImgH (mm) |
| numerical value | −43.13 | 3.15 | −2.30 | 4.56 | 3.08 |

Figure 8A:
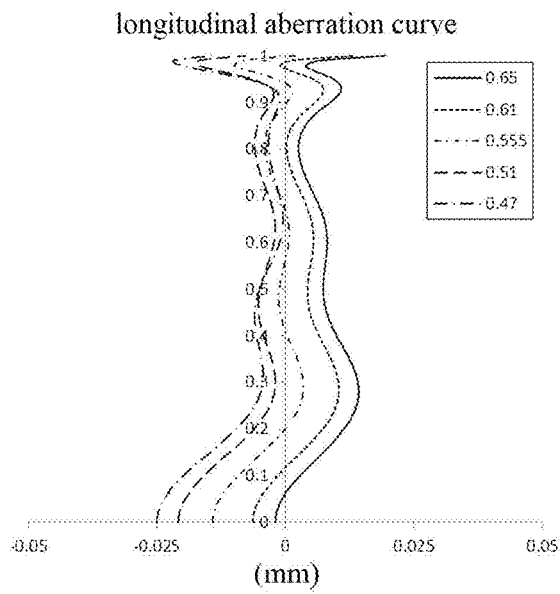
FIGS. 8A-8D respectively illustrate a longitudinal aberration curve, an astigmatic curve, a distortion curve, and a lateral color curve of the camera lens assembly according to Embodiment 4.
Figure 8B:
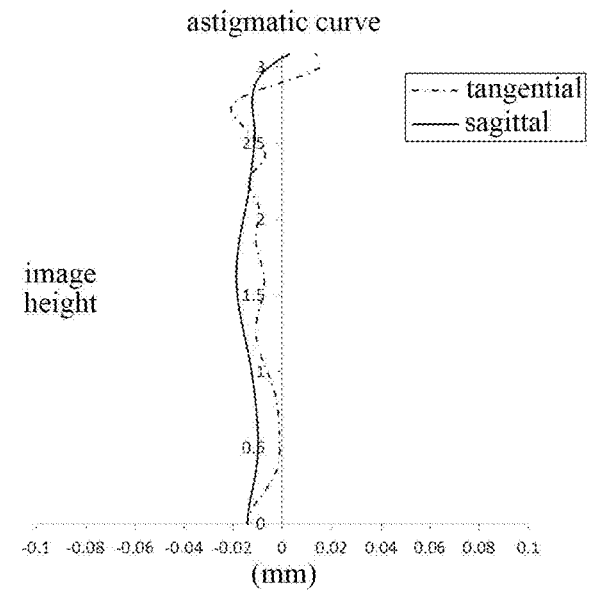
Figure 8C:
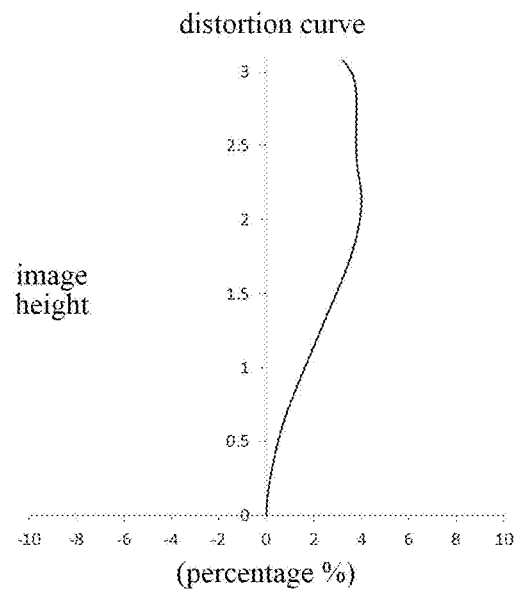
Figure 8D:
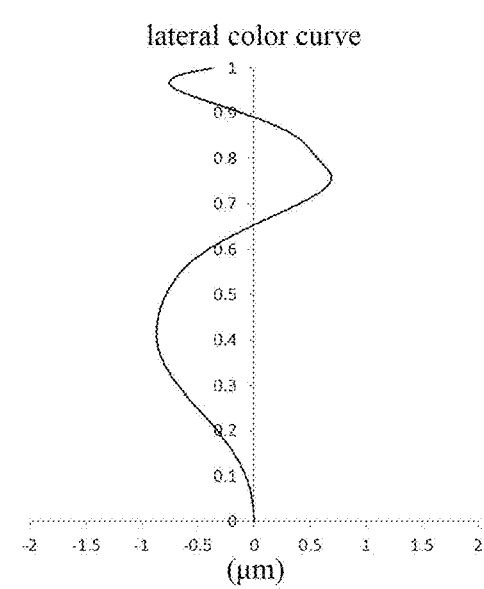

FIG. 8A illustrates the longitudinal aberration curve of the camera lens assembly according to Embodiment 4, representing deviations of focal points where lights of different wavelengths converge after passing through the lens assembly. FIG. 8B illustrates the astigmatic curve of the camera lens assembly according to Embodiment 4, representing a curvature of the tangential image plane and a curvature of the sagittal image plane. FIG. 8C illustrates the distortion curve of the camera lens assembly according to Embodiment 4, representing degrees of distortion at different viewing angles. FIG. 8D illustrates the lateral color curve of the camera lens assembly according to Embodiment 4, representing deviations of different heights of images formed on the image plane by light passing through the lens assembly. It can be seen from FIGS. 8A-8D that the camera lens assembly according to Embodiment 4 can achieve a good imaging quality.

Embodiment 5

Figure 9:
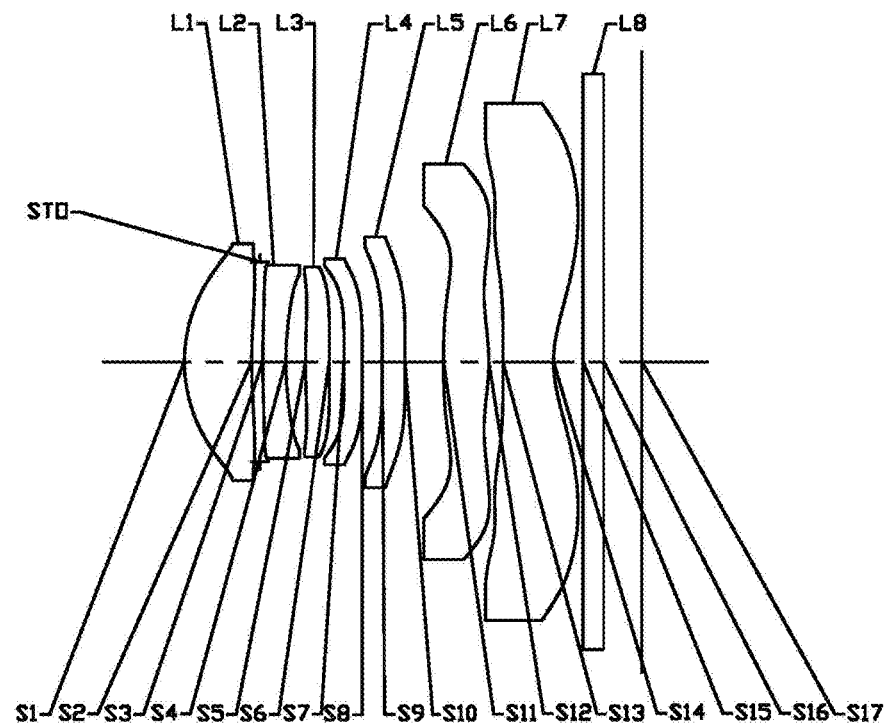
FIG. 9 is a schematic structural diagram illustrating a camera lens assembly according to Embodiment 5 of the present disclosure.

A camera lens assembly according to Embodiment 5 of the present disclosure is described below with reference to FIGS. 9-10D. FIG. 9 is a schematic structural diagram illustrating the camera lens assembly according to Embodiment 5 of the present disclosure.

As shown in FIG. 9, the camera lens assembly according to the exemplary implementations of the present disclosure includes, sequentially along an optical axis from an object side to an image side, a first lens L1, a diaphragm STO, a second lens L2, a third lens L3, a fourth lens L4, a fifth lens L5, a sixth lens L6, a seventh lens L7, an optical filter L8, and an image plane S17.

The first lens L1 has a positive refractive power, an object-side surface S1 of the first lens L1 is a convex surface, and an image-side surface S2 of the first lens L1 is a concave surface. The second lens L2 has a negative refractive power, an object-side surface S3 of the second lens L2 is a convex surface, and an image-side surface S4 of the second lens L2 is a concave surface. The third lens l3 has a positive refractive power, an object-side surface S5 of the third lens L3 is a convex surface, and an image-side surface S6 of the third lens L3 is a convex surface. The fourth lens L4 has a positive refractive power, an object-side surface S7 of the fourth lens L4 is a convex surface, and an image-side surface S8 of the fourth lens L4 is a convex surface. The fifth lens L5 has a negative refractive power, an object-side surface S9 of the fifth lens L5 is a concave surface, and an image-side surface S10 of the fifth lens L5 is a concave surface. The sixth lens L6 has a positive refractive power, an object-side surface S11 of the sixth lens L6 is a convex surface, and an image-side surface S12 of the sixth lens L6 is a convex surface. The seventh lens L7 has a negative refractive power, an object-side surface S13 of the seventh lens L7 is a convex surface, and an image-side surface S14 of the seventh lens L7 is a concave surface. The optical filter L8 has an object-side surface S15 and an image-side surface S16. Light from an object sequentially passes through the surfaces S1-S16 and finally forms an image on the image plane S17.

Table 13 shows the surface type, the radius of curvature, the thickness, the material and the conic coefficient of each lens of the camera lens assembly in Embodiment 5. The units of the radius of curvature and the thickness are both millimeters (mm).

TABLE 13

| surface number | surface type | radius of curvature | thickness | refractive index | abbe number | conic coefficient |
|---|---|---|---|---|---|---|
| OBJ | spherical | infinite | infinite | | | |
| S1 | aspheric | 1.5157 | 0.6697 | 1.55 | 56.1 | −0.1573 |
| S2 | aspheric | 5.7110 | 0.0801 | | | −25.3165 |
| STO | spherical | infinite | 0.0300 | | | |
| S3 | aspheric | 7.6206 | 0.2300 | 1.67 | 20.4 | −26.7073 |
| S4 | aspheric | 3.2957 | 0.1960 | | | −1.2712 |
| S5 | aspheric | 10.8073 | 0.2420 | 1.54 | 56.0 | −98.9925 |
| S6 | aspheric | −168.5487 | 0.1462 | | | −99.0000 |
| S7 | aspheric | 99.0000 | 0.1800 | 1.55 | 56.1 | 99.0000 |
| S8 | aspheric | −99.0000 | 0.2000 | | | 6.0311 |
| S9 | aspheric | −99.0000 | 0.2261 | 1.67 | 20.4 | −99.0000 |
| S10 | aspheric | 102.5926 | 0.3830 | | | 99.0000 |
| S11 | aspheric | 11.3136 | 0.4502 | 1.55 | 56.1 | 45.9948 |
| S12 | aspheric | −2.0281 | 0.1400 | | | −22.8255 |
| S13 | aspheric | 38.5860 | 0.5023 | 1.54 | 55.8 | 99.0000 |
| S14 | aspheric | 1.1761 | 0.2944 | | | −6.6817 |
| S15 | spherical | infinite | 0.2100 | 1.52 | 64.2 | |
| S16 | spherical | infinite | 0.3800 | | | |
| S17 | spherical | infinite | | | | |

As may be obtained from Table 13, in Embodiment 5, the object-side surface and the image-side surface of each lens in the first to seventh lenses L1-L7 are both aspheric surfaces. Table 14 shows the high-order coefficients applicable to each aspheric surface in Embodiment 5. The surface type of each aspheric surface may be defined by the formula (1) given in Embodiment 1.

TABLE 14

| surface number | A4 | A6 | A8 | A10 | A12 |
|---|---|---|---|---|---|
| S1 | 6.0551E−04 | 3.0026E−02 | −1.1089E−01 | 2.2595E−01 | −2.6806E−01 |
| S2 | −5.2015E−02 | −7.1564E−02 | 3.8739E−01 | −9.9658E−01 | 1.6662E+00 |
| S3 | −1.1495E−01 | 3.2475E−02 | 1.7174E−01 | 1.1787E−01 | −1.1378E+00 |
| S4 | −2.8264E−02 | −1.9850E−01 | 1.8803E+00 | −8.5804E+00 | 2.6411E+01 |
| S5 | 3.0428E−02 | −4.1536E−01 | 1.9552E+00 | −9.4253E+00 | 2.9910E+01 |
| S6 | 1.4904E−02 | −5.5515E−01 | 2.4919E+00 | −9.6007E+00 | 2.4377E+01 |
| S7 | −1.6130E−01 | 4.7353E−02 | −2.0712E+00 | 1.0179E+01 | −2.7196E+01 |
| S8 | −1.0893E−01 | −2.3527E−01 | 3.3539E−01 | −3.9584E−01 | 1.0267E+00 |
| S9 | −8.5152E−02 | −1.6386E−01 | 4.5281E−01 | −1.1069E+00 | 2.3641E+00 |
| S10 | −9.7417E−02 | −1.5208E−01 | 4.2939E−01 | −9.3997E−01 | 1.6612E+00 |
| S11 | 1.4509E−01 | −1.5861E−01 | 1.0665E−01 | −2.0310E−01 | 2.4658E−01 |
| S12 | 1.3331E−01 | 1.6545E−01 | −3.8250E−01 | 2.9365E−01 | −1.1728E−01 |
| S13 | −1.0207E−01 | 2.6699E−02 | 6.4830E−03 | 1.9414E−02 | −2.1403E−02 |
| S14 | −9.0439E−02 | 4.5947E−02 | −2.1362E−02 | 8.8635E−03 | −3.0540E−03 |

| surface number | A14 | A16 | A18 | A20 |
|---|---|---|---|---|
| S1 | 1.5227E−01 | −6.5149E−03 | −3.9346E−02 | 1.3378E−02 |
| S2 | −1.8460E+00 | 1.2664E+00 | −4.8169E−01 | 7.7113E−02 |
| S3 | 2.1560E+00 | −2.0803E+00 | 1.0824E+00 | −2.4113E−01 |
| S4 | −5.2230E+01 | 6.3462E+01 | −4.3093E+01 | 1.2619E+01 |
| S5 | −5.9589E+01 | 7.2047E+01 | −4.8233E+01 | 1.3780E+01 |
| S6 | −3.9502E+01 | 3.9500E+01 | −2.2203E+01 | 5.3444E+00 |
| S7 | 4.3871E+01 | −4.1925E+01 | 2.1379E+01 | −4.3400E+00 |
| S8 | −2.0499E+00 | 2.2162E+00 | −1.3147E+00 | 3.6598E−01 |
| S9 | −3.2289E+00 | 2.5055E+00 | −1.0116E+00 | 1.6667E−01 |
| S10 | −1.8806E+00 | 1.2458E+00 | −4.3945E−01 | 6.3755E−02 |
| S11 | −1.7022E−01 | 6.8455E−02 | −1.4809E−02 | 1.3191E−03 |
| S12 | 2.5184E−02 | −2.5474E−03 | 4.5267E−05 | 7.0686E−06 |
| S13 | 8.4021E−03 | −1.6344E−03 | 1.5996E−04 | −6.3221E−06 |
| S14 | 7.5309E−04 | −1.1683E−04 | 9.9840E−06 | −3.5534E−07 |

Table 15 shows the total effective focal length f of the camera lens assembly in Embodiment 5, the effective focal lengths f1-f7 of the lenses, the total track length TTL of the camera lens assembly, and the half ImgH of the diagonal length of the effective pixel area on the image plane S17.

TABLE 15

| parameter | f (mm) | f1 (mm) | f2 (mm) | f3 (mm) | f4 (mm) |
|---|---|---|---|---|---|
| numerical value | 3.75 | 3.58 | −8.90 | 18.59 | 90.70 |
| parameter | f5 (mm) | f6 (mm) | f7 (mm) | TTL (mm) | ImgH (mm) |
| numerical value | −75.56 | 3.19 | −2.27 | 4.56 | 3.08 |

Figures 10A, 10B:
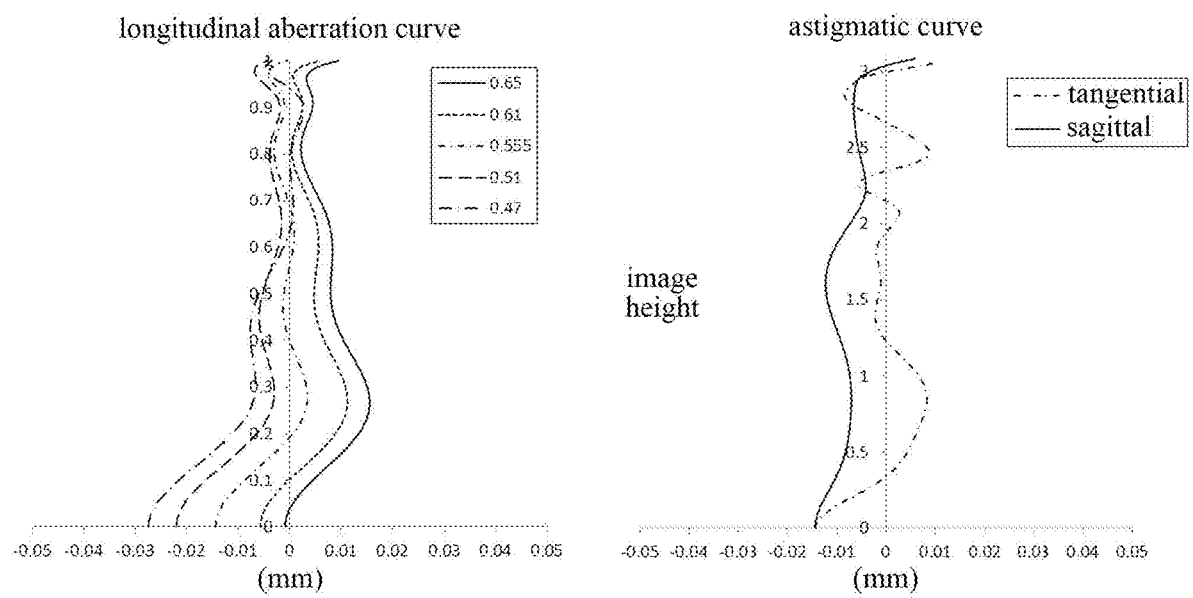

FIG. 10A illustrates the longitudinal aberration curve of the camera lens assembly according to Embodiment 5, representing deviations of focal points where lights of different wavelengths converge after passing through the lens assembly. FIG. 10B illustrates the astigmatic curve of the camera lens assembly according to Embodiment 5, representing a curvature of the tangential image plane and a curvature of the sagittal image plane. FIG. 10C illustrates the distortion curve of the camera lens assembly according to Embodiment 5, representing degrees of distortion at different viewing angles. FIG. 10D illustrates the lateral color curve of the camera lens assembly according to Embodiment 5, representing deviations of different heights of images formed on the image plane by light passing through the lens assembly. It can be seen from FIGS. 10A-10D that the camera lens assembly according to Embodiment 5 can achieve a good imaging quality.

Embodiment 6

A camera lens assembly according to Embodiment 6 of the present disclosure is described below with reference to FIGS. 1-12D. FIG. 11 is a schematic structural diagram illustrating the camera lens assembly according to Embodiment 6 of the present disclosure.

As shown in FIG. 11, the camera lens assembly according to the exemplary implementations of the present disclosure includes, sequentially along an optical axis from an object side to an image side, a first lens L1, a diaphragm STO, a second lens L2, a third lens L3, a fourth lens L4, a fifth lens L5, a sixth lens L6, a seventh lens L7, an optical filter L8, and an image plane S17.

The first lens L1 has a positive refractive power, an object-side surface S1 of the first lens L1 is a convex surface, and an image-side surface S2 of the first lens L1 is a concave surface. The second lens L2 has a negative refractive power, an object-side surface S3 of the second lens L2 is a convex surface, and an image-side surface S4 of the second lens L2 is a concave surface. The third lens l3 has a negative refractive power, an object-side surface S5 of the third lens L3 is a concave surface, and an image-side surface S6 of the third lens L3 is a concave surface. The fourth lens L4 has a positive refractive power, an object-side surface S7 of the fourth lens L4 is a convex surface, and an image-side surface S8 of the fourth lens L4 is a convex surface. The fifth lens L5 has a negative refractive power, an object-side surface S9 of the fifth lens L5 is a concave surface, and an image-side surface S10 of the fifth lens L5 is a concave surface. The sixth lens L6 has a positive refractive power, an object-side surface S11 of the sixth lens L6 is a convex surface, and an image-side surface S12 of the sixth lens L6 is a convex surface. The seventh lens L7 has a negative refractive power, an object-side surface S13 of the seventh lens L7 is a convex surface, and an image-side surface S14 of the seventh lens L7 is a concave surface. The optical filter L8 has an object-side surface S15 and an image-side surface S16. Light from an object sequentially passes through the surfaces S1-S16 and finally forms an image on the image plane S17.

Table 16 shows the surface type, the radius of curvature, the thickness, the material and the conic coefficient of each lens of the camera lens assembly in Embodiment 6. The units of the radius of curvature and the thickness are both millimeters (mm).

TABLE 16

| surface number | surface type | radius of curvature | thick- ness | material refractive index | abbe num- ber | conic coefficient |
|---|---|---|---|---|---|---|
| OBJ | spherical | infinite | infinite | | | |
| S1 | aspheric | 1.5284 | 0.6660 | 1.55 | 56.1 | −0.1598 |
| S2 | aspheric | 5.7110 | 0.0775 | | | −31.7033 |
| STO | spherical | infinite | 0.0300 | | | |
| S3 | aspheric | 7.3480 | 0.2300 | 1.67 | 20.4 | −24.6095 |
| S4 | aspheric | 3.6414 | 0.2054 | | | 1.5603 |
| S5 | aspheric | −1000.0000 | 0.2420 | 1.54 | 56.0 | 98.9999 |
| S6 | aspheric | 99.0000 | 0.1000 | | | −99.0000 |
| S7 | aspheric | 9.6133 | 0.1800 | 1.55 | 56.1 | −57.0215 |
| S8 | aspheric | −99.0000 | 0.2000 | | | −99.0000 |
| S9 | aspheric | −99.0000 | 0.2211 | 1.67 | 20.4 | −99.0000 |
| S10 | aspheric | 69.7820 | 0.4332 | | | 99.0000 |
| S11 | aspheric | 10.9584 | 0.4583 | 1.55 | 56.1 | 35.8696 |
| S12 | aspheric | −2.0348 | 0.1400 | | | −20.4746 |
| S13 | aspheric | 99.0000 | 0.4900 | 1.54 | 55.8 | −99.0000 |
| S14 | aspheric | 1.1744 | 0.2965 | | | −6.9293 |
| S15 | spherical | infinite | 0.2100 | 1.52 | 64.2 | |
| S16 | spherical | infinite | 0.3800 | | | |
| S17 | spherical | infinite | | | | |

As may be obtained from Table 16, in Embodiment 6, the object-side surface and the image-side surface of each lens in the first to seventh lenses L1-L7 are both aspheric surfaces. Table 17 shows the high-order coefficients applicable to each aspheric surface in Embodiment 6. The surface type of each aspheric surface may be defined by the formula (1) given in Embodiment 1.

TABLE 17

| surface number | A4 | A6 | A8 | A10 | A12 |
|---|---|---|---|---|---|
| S1 | −9.7750E−04 | 4.0207E−02 | −1.6732E−01 | 4.0534E−01 | −6.2409E−01 |
| S2 | −5.1596E−02 | −5.2802E−02 | 1.4964E−01 | −1.0663E−01 | −1.1388E−01 |
| S3 | −9.9317E−02 | 6.6921E−03 | −2.2974E−02 | 1.0298E+00 | −2.9027E+00 |
| S4 | −4.6002E−03 | −2.2266E−01 | 1.6017E+00 | −6.7565E+00 | 2.0360E+01 |
| S5 | 5.0687E−02 | −3.6169E−01 | 1.4000E+00 | −6.2971E+00 | 1.9705E+01 |
| S6 | −8.3882E−03 | −5.0086E−01 | 2.0204E+00 | −7.0682E+00 | 1.6503E+01 |
| S7 | −1.7231E−01 | −1.2135E−01 | −9.7132E−01 | 5.7184E+00 | −1.6533E+01 |
| S8 | −1.0387E−01 | −2.7680E−01 | 6.6994E−01 | −1.7038E+00 | 4.0119E+00 |
| S9 | −9.9993E−02 | −9.5016E−02 | 3.4788E−01 | −8.3128E−01 | 1.8253E+00 |
| S10 | −1.1673E−01 | −8.0658E−02 | 3.0430E−01 | −6.6320E−01 | 1.1636E+00 |
| S11 | 1.0958E−01 | −9.7921E−02 | 1.5330E−02 | −5.8817E−02 | 8.9526E−02 |
| S12 | 1.3582E−01 | 8.6344E−02 | −2.0942E−01 | 1.1631E−01 | −1.1783E−02 |
| S13 | −1.0932E−01 | 4.0235E−02 | −3.8002E−03 | 2.4754E−02 | −2.3902E−02 |
| S14 | −8.1176E−02 | 3.0950E−02 | −6.1060E−03 | −6.2063E−04 | 5.9247E−04 |

| surface number | A14 | A16 | A18 | A20 |
|---|---|---|---|---|
| S1 | 5.9325E−01 | −3.3700E−01 | 9.7385E−02 | −1.0367E−02 |
| S2 | 2.9461E−01 | −2.7885E−01 | 1.3525E−01 | −2.7625E−02 |
| S3 | 3.9373E+00 | −2.9243E+00 | 1.1447E+00 | −1.8395E−01 |
| S4 | −3.9805E+01 | 4.7813E+01 | −3.2071E+01 | 9.3116E+00 |
| S5 | −3.9078E+01 | 4.7041E+01 | −3.1292E+01 | 8.8904E+00 |
| S6 | −2.4771E+01 | 2.2834E+01 | −1.1746E+01 | 2.5662E+00 |
| S7 | 2.8818E+01 | −3.0188E+01 | 1.7136E+01 | −3.9335E+00 |
| S8 | −6.0709E+00 | 5.2413E+00 | −2.4008E+00 | 4.8321E−01 |
| S9 | −2.6351E+00 | 2.1360E+00 | −8.9462E−01 | 1.5269E−01 |
| S10 | −1.3156E+00 | 8.6310E−01 | −2.9873E−01 | 4.2204E−02 |
| S11 | −6.8385E−02 | 3.0766E−02 | −7.5162E−03 | 7.5527E−04 |
| S12 | −1.3652E−02 | 6.2368E−03 | −1.0787E−03 | 6.9402E−05 |
| S13 | 9.3236E−03 | −1.8475E−03 | 1.8629E−04 | −7.6428E−06 |
| S14 | −1.1205E−04 | 5.7468E−06 | 5.2076E−07 | −5.0079E−08 |

Table 18 shows the total effective focal length f of the camera lens assembly in Embodiment 6, the effective focal lengths f1-f7 of the lenses, the total track length TTL of the camera lens assembly, and the half ImgH of the diagonal length of the effective pixel area on the image plane S17.

TABLE 18

| parameter | f (mm) | f1 (mm) | f2 (mm) | f3 (mm) | f4 (mm) |
|---|---|---|---|---|---|
| numerical value | 3.75 | 3.62 | −11.11 | −164.83 | 16.06 |
| parameter | f5 (mm) | f6 (mm) | f7 (mm) | TTL (mm) | ImgH (mm) |
| numerical value | −61.38 | 3.18 | −2.22 | 4.56 | 3.08 |

Figure 12A:
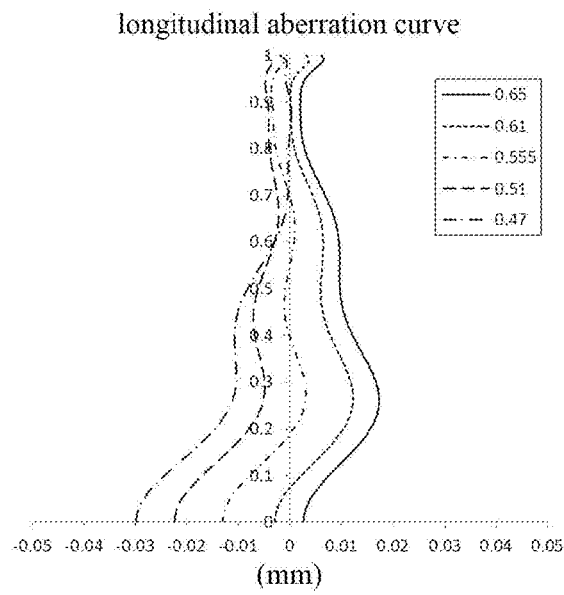
FIGS. 12A-12D respectively illustrate a longitudinal aberration curve, an astigmatic curve, a distortion curve, and a lateral color curve of the camera lens assembly according to Embodiment 6.
Figure 12B:
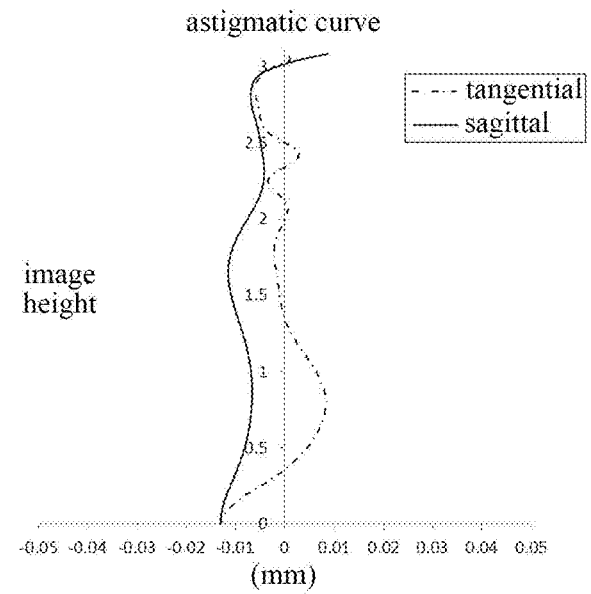
Figure 12C:
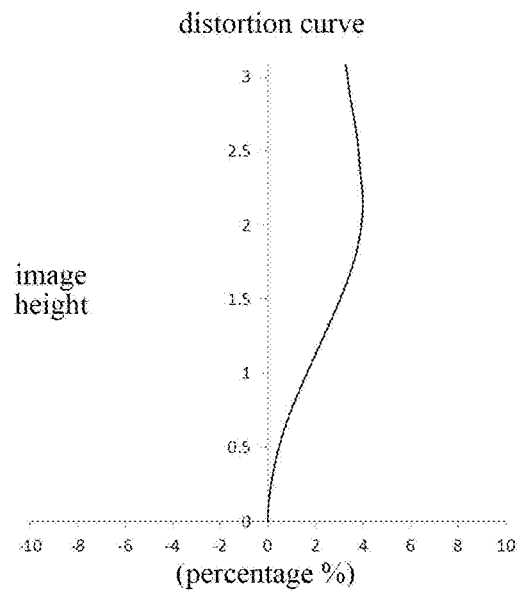
Figure 12D:
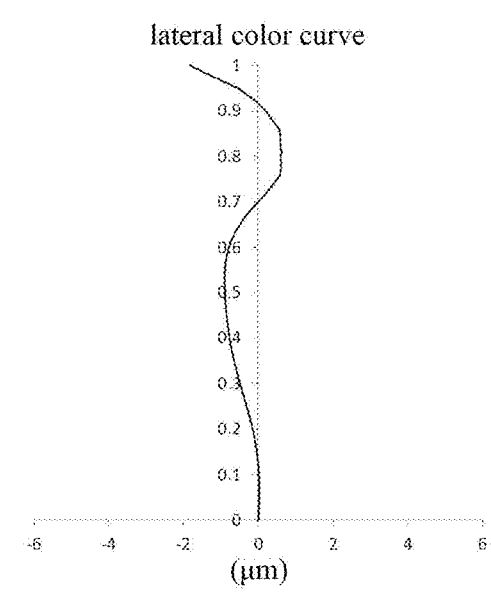

FIG. 12A illustrates the longitudinal aberration curve of the camera lens assembly according to Embodiment 6, representing deviations of focal points where lights of different wavelengths converge after passing through the lens assembly. FIG. 12B illustrates the astigmatic curve of the camera lens assembly according to Embodiment 6, representing a curvature of the tangential image plane and a curvature of the sagittal image plane. FIG. 12C illustrates the distortion curve of the camera lens assembly according to Embodiment 6, representing degrees of distortion at different viewing angles. FIG. 12D illustrates the lateral color curve of the camera lens assembly according to Embodiment 6, representing deviations of different heights of images formed on the image plane by light passing through the lens assembly. It can be seen from FIGS. 12A-12D that the camera lens assembly according to Embodiment 6 can achieve a good imaging quality.

Embodiment 7

Figure 13:
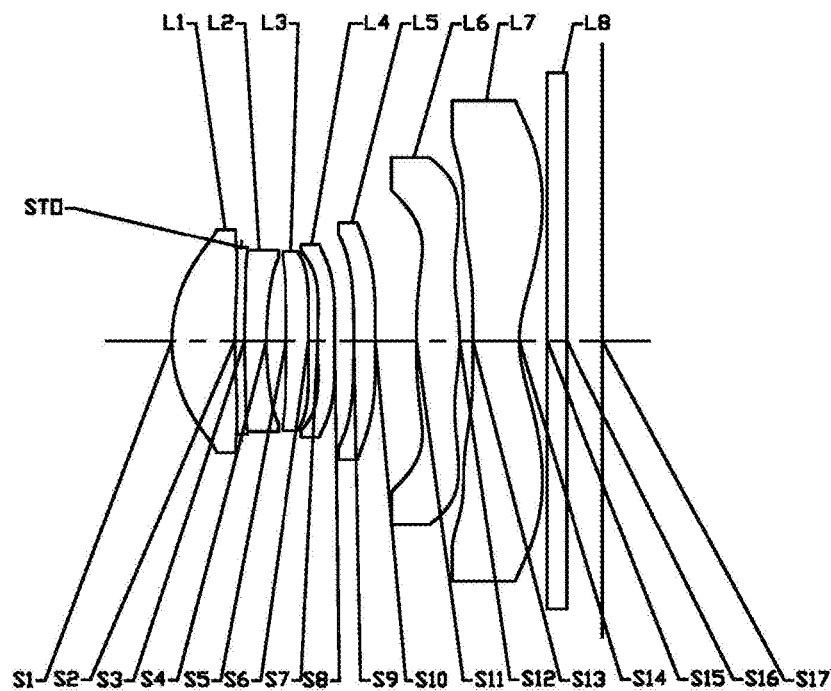
FIG. 13 is a schematic structural diagram illustrating a camera lens assembly according to Embodiment 7 of the present disclosure.

A camera lens assembly according to Embodiment 7 of the present disclosure is described below with reference to FIGS. 13-14D. FIG. 13 is a schematic structural diagram illustrating the camera lens assembly according to Embodiment 7 of the present disclosure.

As shown in FIG. 13, the camera lens assembly according to the exemplary implementations of the present disclosure includes, sequentially along an optical axis from an object side to an image side, a first lens L1, a diaphragm STO, a second lens L2, a third lens L3, a fourth lens L4, a fifth lens L5, a sixth lens L6, a seventh lens L7, an optical filter L8, and an image plane S17.

The first lens L1 has a positive refractive power, an object-side surface S1 of the first lens L1 is a convex surface, and an image-side surface S2 of the first lens L1 is a concave surface. The second lens L2 has a negative refractive power, an object-side surface S3 of the second lens L2 is a convex surface, and an image-side surface S4 of the second lens L2 is a concave surface. The third lens l3 has a negative refractive power, an object-side surface S5 of the third lens L3 is a concave surface, and an image-side surface S6 of the third lens L3 is a concave surface. The fourth lens L4 has a positive refractive power, an object-side surface S7 of the fourth lens L4 is a convex surface, and an image-side surface S8 of the fourth lens L4 is a convex surface. The fifth lens L5 has a negative refractive power, an object-side surface S9 of the fifth lens L5 is a concave surface, and an image-side surface S10 of the fifth lens L5 is a concave surface. The sixth lens L6 has a positive refractive power, an object-side surface S11 of the sixth lens L6 is a convex surface, and an image-side surface S12 of the sixth lens L6 is a convex surface. The seventh lens L7 has a negative refractive power, an object-side surface S13 of the seventh lens L7 is a convex surface, and an image-side surface S14 of the seventh lens L7 is a concave surface. The optical filter L8 has an object-side surface S15 and an image-side surface S16. Light from an object sequentially passes through the surfaces S1-S16 and finally forms an image on the image plane S17.

Table 19 shows the surface type, the radius of curvature, the thickness, the material and the conic coefficient of each lens of the camera lens assembly in Embodiment 7. The units of the radius of curvature and the thickness are both millimeters (mm).

TABLE 19

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 1.5314 | 0.6659 | 1.55 | 56.1 | −0.1598 |
| S2 | aspheric | 6.3934 | 0.0726 | | | −31.7412 |
| STO | spherical | infinite | 0.0300 | | | |
| S3 | aspheric | 8.2295 | 0.2300 | 1.67 | 20.4 | −21.0926 |
| S4 | aspheric | 3.6668 | 0.2092 | | | 1.3261 |
| S5 | aspheric | −100.0000 | 0.2420 | 1.54 | 56.0 | 99.0000 |
| S6 | aspheric | 99.0000 | 0.0978 | | | 99.0000 |
| S7 | aspheric | 8.5527 | 0.1800 | 1.55 | 56.1 | −52.4279 |
| S8 | aspheric | −97.1550 | 0.2000 | | | −99.0000 |
| S9 | aspheric | −55.2175 | 0.2274 | 1.67 | 20.4 | 99.0000 |
| S10 | aspheric | 99.0000 | 0.4348 | | | −99.0000 |
| S11 | aspheric | 10.9949 | 0.4560 | 1.55 | 56.1 | 36.4459 |
| S12 | aspheric | −2.0348 | 0.1400 | | | −20.8404 |
| S13 | aspheric | 99.0000 | 0.4900 | 1.54 | 55.8 | 99.0000 |
| S14 | aspheric | 1.1710 | 0.2943 | | | −6.8175 |
| S15 | spherical | infinite | 0.2100 | 1.52 | 64.2 | |
| S16 | spherical | infinite | 0.3800 | | | |
| S17 | spherical | infinite | | | | |

As may be obtained from Table 19, in Embodiment 7, the object-side surface and the image-side surface of each lens in the first to seventh lenses L1-L7 are both aspheric surfaces. Table 20 shows the high-order coefficients applicable to each aspheric surface in Embodiment 7. The surface type of each aspheric surface may be defined by the formula (1) given in Embodiment 1.

TABLE 20

| surface number | A4 | A6 | A8 | A10 | A12 |
|---|---|---|---|---|---|
| S1 | −2.9470E−03 | 5.9079E−02 | −2.5000E−01 | 6.2731E−01 | −9.9866E−01 |
| S2 | −5.1916E−02 | −7.9253E−02 | 3.2517E−01 | −6.7064E−01 | 9.9558E−01 |
| S3 | −9.6307E−02 | −2.2559E−02 | 1.6668E−01 | 2.7814E−01 | −9.5164E−01 |
| S4 | 7.5238E−04 | −2.8121E−01 | 1.9946E+00 | −8.5449E+00 | 2.5497E+01 |
| S5 | 5.9919E−02 | −4.6251E−01 | 2.0732E+00 | −9.5739E+00 | 2.9957E+01 |
| S6 | −1.0006E−03 | −5.5019E−01 | 2.2064E+00 | −7.6114E+00 | 1.7336E+01 |
| S7 | −1.7164E−01 | −6.8875E−02 | −1.5239E+00 | 8.8392E+00 | −2.7340E+01 |
| S8 | −1.0826E−01 | −2.4999E−01 | 5.5310E−01 | −1.2089E+00 | 2.3812E+00 |

TABLE 20-continued

| | | | | | |
|---|---|---|---|---|---|
| S9 | −1.0231E−01 | −1.0716E−01 | 4.4050E−01 | −1.0656E+00 | 2.1325E+00 |
| S10 | −1.1812E−01 | −8.4912E−02 | 3.3588E−01 | −7.3397E−01 | 1.2420E+00 |
| S11 | 1.1117E−01 | −1.0299E−01 | 3.1637E−02 | −9.2358E−02 | 1.2846E−01 |
| S12 | 1.3597E−01 | 8.7825E−02 | −2.0684E−01 | 1.0616E−01 | −9.9885E−04 |
| S13 | −1.1203E−01 | 4.3991E−02 | −7.9466E−03 | 2.8601E−02 | −2.6171E−02 |
| S14 | −8.7772E−02 | 4.1321E−02 | −1.5802E−02 | 4.9293E−03 | −1.4134E−03 |

| surface number | A14 | A16 | A18 | A20 |
|---|---|---|---|---|
| S1 | 9.9127E−01 | −5.9416E−01 | 1.8909E−01 | −2.4187E−02 |
| S2 | −1.0750E+00 | 7.4648E−01 | −2.8833E−01 | 4.6252E−02 |
| S3 | 6.5020E−01 | 4.8869E−01 | −8.2445E−01 | 2.9723E−01 |
| S4 | −4.9030E+01 | 5.7892E+01 | −3.8216E+01 | 1.0922E+01 |
| S5 | −5.9051E+01 | 7.0639E+01 | −4.6790E+01 | 1.3227E+01 |
| S6 | −2.4846E+01 | 2.1435E+01 | −1.0157E+01 | 2.0163E+00 |
| S7 | 5.1518E+01 | −5.8119E+01 | 3.5575E+01 | −8.9622E+00 |
| S8 | −2.6946E+00 | 1.1908E+00 | 1.6468E−01 | −1.7714E−01 |
| S9 | −2.8383E+00 | 2.1695E+00 | −8.6343E−01 | 1.3984E−01 |
| S10 | −1.3608E+00 | 8.7432E−01 | −2.9832E−01 | 4.1691E−02 |
| S11 | −9.6552E−02 | 4.3389E−02 | −1.0669E−02 | 1.0862E−03 |
| S12 | −1.9335E−02 | 7.8772E−03 | −1.3275E−03 | 8.4934E−05 |
| S13 | 1.0111E−02 | −2.0052E−03 | 2.0337E−04 | −8.4222E−06 |
| S14 | 3.4692E−04 | −5.8639E−05 | 5.5700E−06 | −2.1932E−07 |

Table 21 shows the total effective focal length f of the camera lens assembly in Embodiment 7, the effective focal lengths f1-f7 of the lenses, the total track length TTL of the camera lens assembly, and the half ImgH of the diagonal length of the effective pixel area on the image plane S17.

TABLE 21

| parameter | f (mm) | f1 (mm) | f2 (mm) | f3 (mm) | f4 (mm) |
|---|---|---|---|---|---|
| numerical value | 3.74 | 3.52 | −10.13 | −91.00 | 14.41 |

| parameter | f5 (mm) | f6 (mm) | f7 (mm) | TTL (mm) | ImgH (mm) |
|---|---|---|---|---|---|
| numerical value | −53.16 | 3.18 | −2.21 | 4.56 | 3.08 |

Figure 14A:
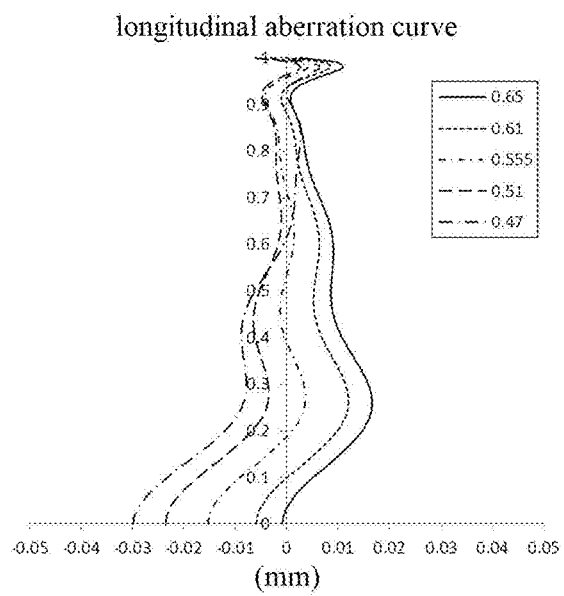
Figure 14B:
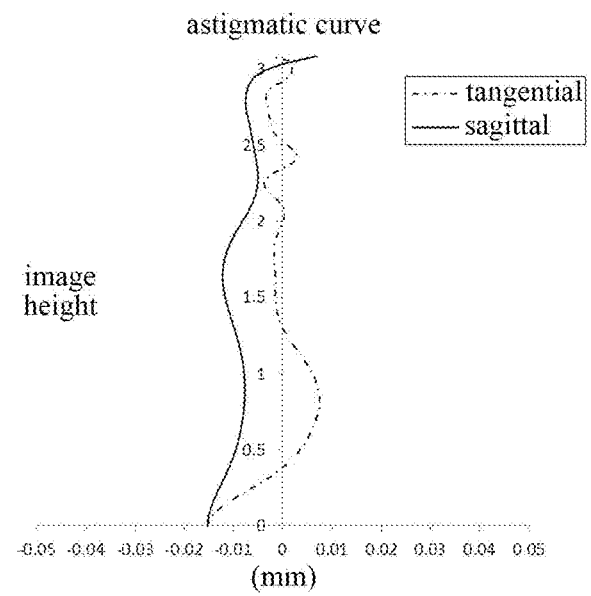

FIG. 14A illustrates the longitudinal aberration curve of the camera lens assembly according to Embodiment 7, representing deviations of focal points where lights of different wavelengths converge after passing through the lens assembly. FIG. 14B illustrates the astigmatic curve of the camera lens assembly according to Embodiment 7, representing a curvature of the tangential image plane and a curvature of the sagittal image plane. FIG. 14C illustrates the distortion curve of the camera lens assembly according to Embodiment 7, representing degrees of distortion at different viewing angles. FIG. 14D illustrates the lateral color curve of the camera lens assembly according to Embodiment 7, representing deviations of different heights of images formed on the image plane by light passing through the lens assembly. It can be seen from FIGS. 14A-14D that the camera lens assembly according to Embodiment 7 can achieve a good imaging quality.

Embodiment 8

A camera lens assembly according to Embodiment 8 of the present disclosure is described below with reference to FIGS. 15-16D. FIG. 15 is a schematic structural diagram illustrating the camera lens assembly according to Embodiment 8 of the present disclosure.

As shown in FIG. 15, the camera lens assembly according to the exemplary implementations of the present disclosure includes, sequentially along an optical axis from an object side to an image side, a first lens L1, a diaphragm STO, a second lens L2, a third lens L3, a fourth lens L4, a fifth lens L5, a sixth lens L6, a seventh lens L7, an optical filter L8, and an image plane S17.

The first lens L1 has a positive refractive power, an object-side surface S1 of the first lens L1 is a convex surface, and an image-side surface S2 of the first lens L1 is a concave surface. The second lens L2 has a negative refractive power, an object-side surface S3 of the second lens L2 is a convex surface, and an image-side surface S4 of the second lens L2 is a concave surface. The third lens l3 has a positive refractive power, an object-side surface S5 of the third lens L3 is a convex surface, and an image-side surface S6 of the third lens L3 is a concave surface. The fourth lens L4 has a negative refractive power, an object-side surface S7 of the fourth lens L4 is a concave surface, and an image-side surface S8 of the fourth lens L4 is a concave surface. The fifth lens L5 has a negative refractive power, an object-side surface S9 of the fifth lens L5 is a convex surface, and an image-side surface S10 of the fifth lens L5 is a concave surface. The sixth lens L6 has a positive refractive power, an object-side surface S11 of the sixth lens L6 is a convex surface, and an image-side surface S12 of the sixth lens L6 is a convex surface. The seventh lens L7 has a negative refractive power, an object-side surface S13 of the seventh lens L7 is a convex surface, and an image-side surface S14 of the seventh lens L7 is a concave surface. The optical filter L8 has an object-side surface S15 and an image-side surface S16. Light from an object sequentially passes through the surfaces S1-S16 and finally forms an image on the image plane S17.

Table 22 shows the surface type, the radius of curvature, the thickness, the material and the conic coefficient of each lens of the camera lens assembly in Embodiment 8. The units of the radius of curvature and the thickness are both millimeters (mm).

TABLE 22

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.5946 | 0.6255 | 1.55 | 56.1 | −0.1675 |
| S2 | aspheric | 5.7110 | 0.0834 | | | −18.9672 |
| STO | spherical | infinite | 0.0300 | | | |
| S3 | aspheric | 4.6745 | 0.2300 | 1.67 | 20.4 | −18.6399 |
| S4 | aspheric | 2.5782 | 0.1960 | | | −2.3300 |
| S5 | aspheric | 4.5293 | 0.2280 | 1.54 | 56.0 | −20.7558 |
| S6 | aspheric | 14.3036 | 0.1914 | | | −99.0000 |
| S7 | aspheric | −89.6703 | 0.1692 | 1.55 | 56.1 | 99.0000 |
| S8 | aspheric | 64.9960 | 0.2500 | | | −99.0000 |
| S9 | aspheric | 11.4336 | 0.3400 | 1.67 | 20.4 | −92.2254 |
| S10 | aspheric | 8.1181 | 0.2793 | | | −80.1729 |
| S11 | aspheric | 6.9806 | 0.5000 | 1.55 | 56.1 | 14.3463 |
| S12 | aspheric | −2.6606 | 0.1460 | | | −25.1831 |
| S13 | aspheric | 55.5072 | 0.5600 | 1.54 | 55.8 | 99.0000 |
| S14 | aspheric | 1.3011 | 0.2649 | | | −7.3552 |
| S15 | spherical | infinite | 0.3164 | 1.52 | 64.2 | |
| S16 | spherical | infinite | 0.3500 | | | |
| S17 | spherical | infinite | | | | |

As may be obtained from Table 22, in Embodiment 8, the object-side surface and the image-side surface of each lens in the first to seventh lenses L1-L7 are both aspheric surfaces. Table 23 shows the high-order coefficients applicable to each aspheric surface in Embodiment 8. The surface type of each aspheric surface may be defined by the formula (1) given in Embodiment 1.

TABLE 23

| surface number | A4 | A6 | A8 | A10 | A12 |
|---|---|---|---|---|---|
| S1 | −2.6924E−04 | 2.3538E−02 | −9.1561E−02 | 1.7250E−01 | −1.7724E−01 |
| S2 | −5.9832E−02 | −5.3346E−02 | 5.0247E−01 | −1.6029E+00 | 2.9824E+00 |
| S3 | −1.2687E−01 | 1.3952E−01 | −1.5064E−01 | 6.3880E−01 | −1.5929E+00 |
| S4 | −4.7959E−02 | −1.5015E−01 | 2.0399E+00 | −9.8116E+00 | 2.9470E+01 |
| S5 | 2.2387E−02 | −6.1593E−02 | −7.3586E−02 | 1.4619E−01 | −8.5956E−02 |
| S6 | −2.4768E−02 | 8.1096E−02 | −9.4703E−01 | 4.1510E+00 | −1.2010E+01 |
| S7 | −1.9208E−01 | 1.7248E−01 | −7.0573E−01 | 2.2699E+00 | −5.8586E+00 |
| S8 | −2.0784E−01 | 3.2467E−02 | 4.1429E−01 | −2.0952E+00 | 4.9244E+00 |
| S9 | −1.5260E−01 | 9.2261E−03 | 1.8748E−01 | −3.8625E−01 | 3.7583E−01 |
| S10 | −1.1501E−01 | −9.6273E−02 | 2.7807E−01 | −3.1465E−01 | 2.1157E−01 |
| S11 | 1.1522E−01 | −1.9703E−01 | 1.9607E−02 | 2.0622E−01 | −3.5859E−01 |
| S12 | 1.8518E−01 | −6.5478E−02 | −3.9937E−02 | 2.8295E−02 | 4.4322E−03 |
| S13 | −1.3328E−01 | 5.0363E−02 | 4.6496E−02 | −4.2917E−02 | 1.4792E−02 |
| S14 | −9.2011E−02 | 4.1673E−02 | −1.0094E−02 | −8.4478E−04 | 1.2182E−03 |

| surface number | A14 | A16 | A18 | A20 |
|---|---|---|---|---|
| S1 | 5.9275E−02 | 4.2443E−02 | −4.6119E−02 | 1.1788E−02 |
| S2 | −3.4314E+00 | 2.3725E+00 | −9.0107E−01 | 1.4411E−01 |
| S3 | 2.1472E+00 | −1.5790E+00 | 5.7943E−01 | −7.4494E−02 |
| S4 | −5.5661E+01 | 6.4059E+01 | −4.0999E+01 | 1.1211E+01 |
| S5 | −3.9472E−01 | 9.2848E−01 | −9.1225E−01 | 4.0034E−01 |
| S6 | 2.1711E+01 | −2.3740E+01 | 1.4330E+01 | −3.6156E+00 |
| S7 | 1.0269E+01 | −1.1283E+01 | 6.9697E+00 | −1.7999E+00 |
| S8 | −6.9770E+00 | 6.0050E+00 | −2.8855E+00 | 5.9857E−01 |
| S9 | −2.7475E−01 | 1.7680E−01 | −8.7842E−02 | 2.1089E−02 |
| S10 | −9.3141E−02 | 2.5998E−02 | −3.7703E−03 | 1.5132E−04 |
| S11 | 3.0580E−01 | −1.4551E−01 | 3.7077E−02 | −3.9830E−03 |
| S12 | −9.1505E−03 | 3.3577E−03 | −5.3362E−04 | 3.2427E−05 |
| S13 | −2.7335E−03 | 2.8761E−04 | −1.6315E−05 | 3.8904E−07 |
| S14 | −3.2699E−04 | 4.2417E−05 | −2.7586E−06 | 7.2048E−08 |

Table 24 shows the total effective focal length f of the camera lens assembly in Embodiment 8, the effective focal lengths f1-f7 of the lenses, the total track length TTL of the camera lens assembly, and the half ImgH of the diagonal length of the effective pixel area on the image plane S17.

TABLE 24

| parameter | f (mm) | f1 (mm) | f2 (mm) | f3 (mm) | f4 (mm) |
|---|---|---|---|---|---|
| numerical value | 3.95 | 3.85 | −9.02 | 12.03 | −69.00 |
| parameter | f5 (mm) | f6 (mm) | f7 (mm) | TTL (mm) | ImgH (mm) |
| numerical value | −43.80 | 3.59 | −2.49 | 4.76 | 3.41 |

Figure 16A:
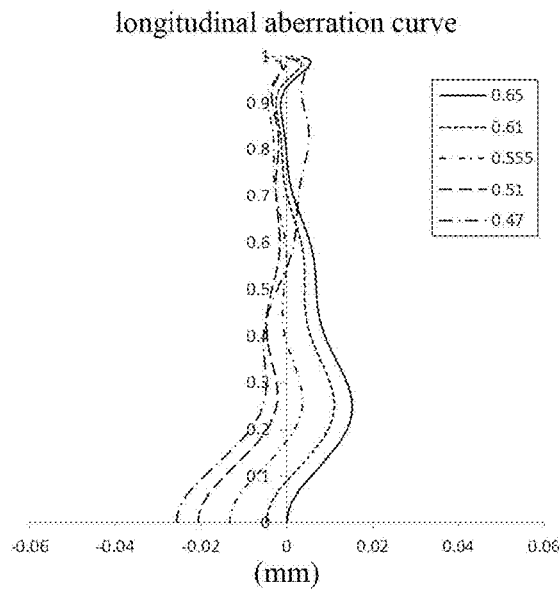
FIGS. 16A-16D respectively illustrate a longitudinal aberration curve, an astigmatic curve, a distortion curve, and a lateral color curve of the camera lens assembly according to Embodiment 8.
Figure 16B:
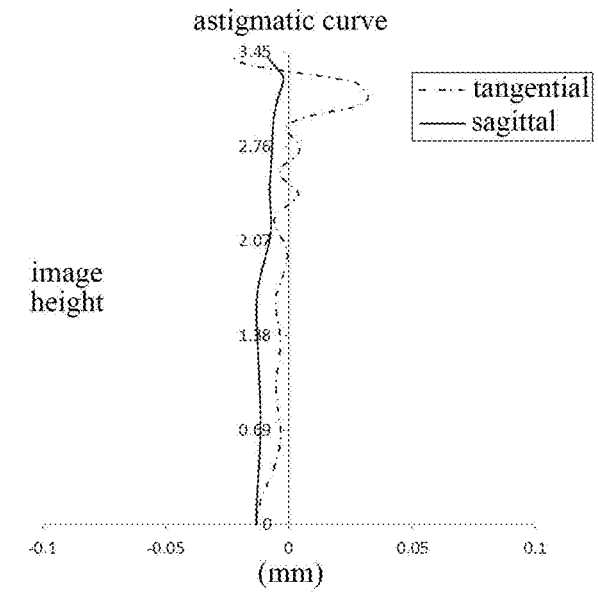
Figure 16C:
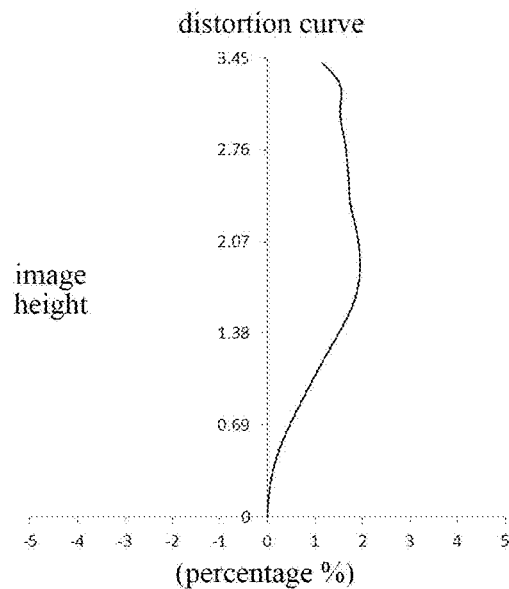
Figure 16D:
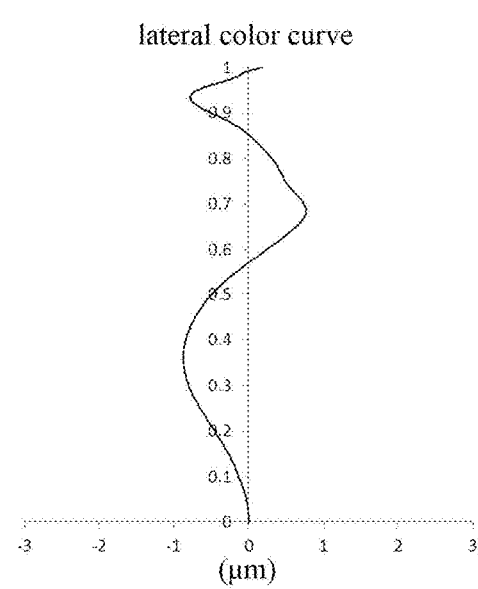

FIG. 16A illustrates the longitudinal aberration curve of the camera lens assembly according to Embodiment 8, representing deviations of focal points where lights of different wavelengths converge after passing through the lens assembly. FIG. 16B illustrates the astigmatic curve of the camera lens assembly according to Embodiment 8, representing a curvature of the tangential image plane and a curvature of the sagittal image plane. FIG. 16C illustrates the distortion curve of the camera lens assembly according to Embodiment 8, representing degrees of distortion at different viewing angles. FIG. 16D illustrates the lateral color curve of the camera lens assembly according to Embodiment 8, representing deviations of different heights of images formed on the image plane by light passing through the lens assembly. It can be seen from FIGS. 16A-16D that the camera lens assembly according to Embodiment 8 can achieve a good imaging quality.

To sum up, Embodiments 1-8 respectively satisfy the relationships shown in Table 25 below.

TABLE 25

| Conditional Expression | Embodiment 1 | 2 | 3 | 4 | 5 | 6 | 7 | 8 |
|---|---|---|---|---|---|---|---|---|
| f/EPD | 1.51 | 1.75 | 1.87 | 1.72 | 1.73 | 1.74 | 1.74 | 1.83 |
| f2/f | −2.57 | −2.24 | −2.19 | −2.20 | −2.38 | −2.97 | −2.71 | −2.29 |
| \|f/f1\| + \|f/f2\| | 1.25 | 1.46 | 1.51 | 1.48 | 1.47 | 1.37 | 1.43 | 1.46 |
| f6/TTL | 0.78 | 0.74 | 0.74 | 0.69 | 0.70 | 0.70 | 0.70 | 0.76 |
| TTL/ImgH | 1.54 | 1.37 | 1.40 | 1.48 | 1.48 | 1.48 | 1.48 | 1.40 |
| f/R1 | 2.06 | 2.42 | 2.51 | 2.44 | 2.47 | 2.45 | 2.44 | 2.48 |
| R2/f1 | 1.50 | 1.52 | 1.52 | 1.57 | 1.60 | 1.58 | 1.82 | 1.48 |
| R1/R14 | 1.10 | 1.25 | 1.26 | 1.28 | 1.29 | 1.30 | 1.31 | 1.23 |
| f7/CT7 | −4.55 | −4.39 | −4.35 | −4.41 | −4.52 | −4.53 | −4.51 | −4.45 |
| CT3/CT4 | 1.14 | 1.37 | 1.36 | 1.36 | 1.34 | 1.34 | 1.34 | 1.35 |
| T56/T67 | 2.18 | 2.40 | 3.11 | 2.27 | 2.74 | 3.09 | 3.11 | 1.91 |
| CT4/CT5 | 0.99 | 0.71 | 0.57 | 0.81 | 0.80 | 0.81 | 0.79 | 0.50 |
| DT11/DT51 | 1.00 | 0.99 | 0.97 | 1.02 | 1.03 | 1.05 | 1.05 | 0.97 |
| SAG71/CT7 | −0.19 | −0.30 | −0.31 | −0.41 | −0.34 | −0.45 | −0.44 | −0.36 |

The present disclosure further provides a camera device having an electronic photosensitive element which may be a photosensitive charge-coupled device (CCD) or complementary metal-oxide semiconductor (CMOS) element. The camera device may be an independent camera device such as a digital camera, or may be a camera module integrated in a mobile electronic device such as a mobile phone and a tablet computer. The camera device is equipped with the camera lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A camera lens assembly comprising, sequentially along an optical axis from an object side to an image side,
    a first lens having a positive refractive power;
    a second lens having a negative refractive power;
    a third lens having a refractive power;
    a fourth lens having a refractive power;
    a fifth lens having a refractive power;
    a sixth lens having a refractive power, wherein an object-side surface of the sixth lens is a convex surface, and an image-side surface of the sixth lens is a convex surface; and
    a seventh lens having a negative refractive power, wherein an object-side surface of the seventh lens is a convex surface,
    wherein an effective focal length f2 of the second lens and a total effective focal length f of the camera lens assembly satisfy: $-3 \leq f2/f < -1.5$, and
    wherein an effective focal length f7 of the seventh lens and a center thickness CT7 of the seventh lens on the optical axis satisfy: $-5 < f7/CT7 < -4$.

2. The camera lens assembly according to claim 1, wherein the total effective focal length f of the camera lens assembly and an entrance pupil diameter EPD of the camera lens assembly satisfy: $f/EPD < 2.0$.

3. The camera lens assembly according to claim 1, wherein the total effective focal length f of the camera lens assembly, an effective focal length f1 of the first lens, and the effective focal length f2 of the second lens satisfy: $1 < |f/f1| + |f/f2| < 1.55$.

4. The camera lens assembly according to claim 1, wherein a radius R2 of curvature of an image-side surface of the first lens and an effective focal length f1 of the first lens satisfy: $1.3 < R2/f1 < 2$.

5. The camera lens assembly according to claim 1, wherein the sixth lens has a positive refractive power, and
    an effective focal length f6 of the sixth lens and a total track length TTL of the camera lens assembly satisfy: $0.6 < f6/TTL < 1.3$.

6. The camera lens assembly according to claim 1, wherein an object-side surface of the first lens is a convex surface, and
    the total effective focal length f of the camera lens assembly and a radius R1 of curvature of the object-side surface of the first lens satisfy: $2 < f/R1 < 2.6$,
    wherein a radius R1 of curvature of an object-side surface of the first lens and a radius R14 of curvature of an image-side surface of the seventh lens satisfy: $1 < R1/R14 < 1.5$,
    wherein an effective semi-diameter DT11 of an object-side surface of the first lens and an effective semi-diameter DT51 of an object-side surface of the fifth lens satisfy: $0.8 < DT11/DT51 < 1.2$.

7. The camera lens assembly according to claim 1, wherein a distance SAG71 on the optical axis from an intersection point between the object-side surface of the seventh lens and the optical axis to a vertex of an effective semi-diameter of the object-side surface of the seventh lens, and a center thickness CT7 of the seventh lens on the optical axis satisfy: $-0.5 < SAG71/CT7 < 0$.

8. The camera lens assembly according to claim 1, wherein the total track length TTL of the camera lens assembly and a half ImgH of a diagonal length of an effective pixel area on an image plane of the camera lens assembly satisfy: $TTL/ImgH < 1.65$.

9. The camera lens assembly according to claim 8, wherein a center thickness CT3 of the third lens on the optical axis and a center thickness CT4 of the fourth lens on the optical axis satisfy: $1 < CT3/CT4 < 1.5$.

10. The camera lens assembly according to claim 8, wherein a center thickness CT4 of the fourth lens on the optical axis and a center thickness CT5 of the fifth lens on the optical axis satisfy: $CT4/CT5 \leq 1$.

11. The camera lens assembly according to claim 8, wherein a spacing distance T56 on the optical axis between the fifth lens and the sixth lens and a spacing distance T67 on the optical axis between the sixth lens and the seventh lens satisfy: $1.5 < T56/T67 < 3.2$.

12. A camera lens assembly comprising, sequentially along an optical axis from an object side to an image side,
    a first lens having a positive refractive power;
    a second lens having a negative refractive power;
    a third lens having a refractive power;
    a fourth lens having a refractive power;
    a fifth lens having a refractive power;
    a sixth lens having a refractive power, wherein an object-side surface of the sixth lens is a convex surface, and an image-side surface of the sixth lens is a convex surface; and
    a seventh lens having a negative refractive power, wherein an object-side surface of the seventh lens is a convex surface, wherein a total effective focal length f of the camera lens assembly, an effective focal length f1 of the first lens, and an effective focal length f2 of the second lens satisfy: $1<|f/f1|+|f2|<1.55$.

13. The camera lens assembly according to claim 12, wherein a radius R1 of curvature of an object-side surface of the first lens and a radius R14 of curvature of an image-side surface of the seventh lens satisfy: $1<R1/R14<1.5$.

14. The camera lens assembly according to claim 13, wherein an object-side surface of the first lens is a convex surface, and the total effective focal length f of the camera lens assembly and a radius R1 of curvature of the object-side surface of the first lens satisfy: $2<f/R1<2.6$, wherein the total effective focal length f of the camera lens assembly and an entrance pupil diameter EPD of the camera lens assembly satisfy: $f/EPD<2.0$, wherein the effective focal length f2 of the second lens and the total effective focal length f of the camera lens assembly satisfy: $-3\leq f2/f<-1.5$, wherein an effective focal length f6 of the sixth lens and a total track length TTL of the camera lens assembly satisfy: $0.6<f6/TTL<1.3$, wherein an effective semi-diameter DT11 of the object-side surface of the first lens and an effective semi-diameter DT51 of an object-side surface of the fifth lens satisfy: $0.8<DT11/DT51<1.2$.

15. The camera lens assembly according to claim 14, wherein an effective focal length f7 of the seventh lens and a center thickness CT7 of the seventh lens on the optical axis satisfy: $-5<f7/CT7<-4$.

16. The camera lens assembly according to claim 15, wherein a distance SAG71 on the optical axis from an intersection point between the object-side surface of the seventh lens and the optical axis to a vertex of an effective semi-diameter of the object-side surface of the seventh lens, and the center thickness CT7 of the seventh lens on the optical axis satisfy: $-0.5<SAG71/CT7<0$.

17. The camera lens assembly according to claim 12, wherein a radius R2 of curvature of an image-side surface of the first lens and the effective focal length f1 of the first lens satisfy: $1.3<R2/f1<2$.

18. The camera lens assembly according to claim 12, wherein a spacing distance T56 on the optical axis between the fifth lens and the sixth lens and a spacing distance T67 on the optical axis between the sixth lens and the seventh lens satisfy: $1.5<T56/T67<3.2$.

19. The camera lens assembly according to claim 12, wherein a total track length of the camera lens assembly and a half ImgH of a diagonal length of an effective pixel area on an image plane of the camera lens assembly satisfy: $TTL/ImgH<1.65$.

* * * * *